US012806520B2

(12) United States Patent
Nakao et al.

(10) Patent No.: US 12,806,520 B2
(45) Date of Patent: Nov. 24, 2026

(54) GAME SYSTEM, GAME PROCESSING METHOD, AND NON-TRANSITORY COMPUTER-READABLE STORAGE MEDIUM HAVING GAME PROGRAM STORED THEREIN

(71) Applicant: NINTENDO CO., LTD., Kyoto (JP)

(72) Inventors: Hajime Nakao, Kyoto (JP); Kojiro Taguchi, Kyoto (JP); Takeshi Wakasugi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 183 days.

(21) Appl. No.: 18/746,634

(22) Filed: Jun. 18, 2024

(65) Prior Publication Data

US 2024/0416230 A1 Dec. 19, 2024

(51) Int. Cl.
*A63F 13/20* (2014.01)
*A63F 13/46* (2014.01)

(52) U.S. Cl.
CPC .................................... *A63F 13/46* (2014.09)

(58) Field of Classification Search
CPC .......... A63F 13/20; A63F 13/22; A63F 13/25; A63F 13/30–35; A63F 13/352; A63F 13/355; A63F 13/358; A63F 13/40; A63F 13/426; A63F 13/44; A63F 13/45; A63F 13/46–52; A63F 13/5375; A63F 13/55; A63F 13/56; A63F 13/58; A63F 13/60; A63F 13/70; A63F 13/77; A63F 13/79; A63F 2300/30; A63F 2300/303; A63F 2300/40; A63F 2300/401–409; A63F 2300/50; A63F 2300/531; A63F 2300/538; A63F 2300/55; A63F 2300/554; A63F 2300/5546; A63F 2300/5566; A63F 2300/5593; A63F 2300/60; A63F 2300/61; A63F 2300/636; A63F 2300/638; A63F 2300/65
See application file for complete search history.

(56) References Cited

U.S. PATENT DOCUMENTS

2004/0224739 A1* 11/2004 Yamada .................. A63F 13/52 463/1
2010/0099495 A1* 4/2010 Brady ...................... A63F 13/30 463/43
2020/0289942 A1* 9/2020 Minka ................... A63F 13/798
2021/0299557 A1* 9/2021 Pare ..................... G06F 9/45558
2024/0224739 A1* 7/2024 Seo ...................... H10K 50/852

FOREIGN PATENT DOCUMENTS

JP 2004-329662 11/2004
JP 2011-098013 5/2011
JP 2018-051263 4/2018
JP 2019037305 A 3/2019
JP 2021-040826 3/2021

* cited by examiner

*Primary Examiner* — Omkar A Deodhar
(74) *Attorney, Agent, or Firm* — Nixon & Vanderhye PC

(57) ABSTRACT

A game apparatus connects to a first other game apparatus group on the basis of a result of a first matching process, and renders a first virtual game space. While the first virtual game space is displayed, when a predetermined stage is selected to be played, a second matching process is performed. In the second matching process, a second other game apparatus group and the game apparatus are matched with selected one or more other game apparatuses as the second other game apparatus group without being limited to the first other game apparatus group matched by the first matching process.

18 Claims, 21 Drawing Sheets

GAME SYSTEM, GAME PROCESSING METHOD, AND NON-TRANSITORY COMPUTER-READABLE STORAGE MEDIUM HAVING GAME PROGRAM STORED THEREIN

CROSS REFERENCE TO RELATED APPLICATION

This application claims priority to Japanese Patent Application No. 2023-099932 filed on Jun. 19, 2023, the entire contents of which are incorporated herein by reference.

FIELD

The present disclosure relates to a matching process in an online multiplayer game.

BACKGROUND AND SUMMARY

Hitherto, a game system for performing a multiplayer game in which a virtual lobby is provided as a meeting place for players, has been known. In the lobby, when a player performs an operation for instructing creation of a matching room, a region that is visible to other players is set at the current position of a player character, and if a player character of another player enters the region, matching with the other player is performed.

In the above game, matching is performed only between players in the lobby. That is, the players that can be matched are limited to only players in the lobby. Therefore, there could be a situation in which there are not enough players to perform multiplay. In addition, if a large number of players are included in the lobby in order to increase the number of players that can be matched, the processing load such as network processing is increased.

For example, the following configuration examples for attaining the object described above are exemplified.

(Configuration 1)

Configuration 1 is directed to a game system comprising a game apparatus connected to a network, a plurality of other game apparatuses connected to the network, and a server. In a first mode, a computer of the game apparatus transmits a request for a first matching process to the server, connects the game apparatus to a first other game apparatus group on the basis of a result of the first matching process received from the server, places an own player character to be controlled to move on the basis of an operation by a player of the game apparatus and at least a part of an other player character group to be controlled to move on the basis of data acquired from each other game apparatus included in the first other game apparatus group, in a first virtual game space, renders the first virtual game space, executes a stage selection process of selecting a predetermined game stage from among a plurality of game stages in accordance with an operation by the player of the game apparatus while the first virtual game space is displayed, and shifts to a second mode in accordance with the stage selection process being executed. In the second mode, the computer of the game apparatus transmits a request for a second matching process to the server, connects the game apparatus to a second other game apparatus group on the basis of a result of the second matching process received from the server, places the own player character and at least a part of an other player character group to be controlled by a player of each other game apparatus included in the second other game apparatus group, in a second virtual game space corresponding to the stage selected by the stage selection process, and renders the second virtual game space. In response to receiving the request for the first matching process from the game apparatus, a computer of the server matches the game apparatus and the first other game apparatus group selected from among the plurality of other game apparatuses as the first matching process, and transmits a result of the first matching process to the game apparatus. In response to receiving the request for the second matching process from the game apparatus, the computer of the server matches the second other game apparatus group and the game apparatus with one or more other game apparatuses selected from among the plurality of other game apparatuses as the second other game apparatus group, without being limited to the first other game apparatus group matched by the first matching process, as the second matching process, and transmits a result of the second matching process to the game apparatus.

According to the above configuration, for example, when a player selects a stage to be played in the first virtual game space such as a “lobby” in an online multiplayer game, matching for members who perform multiplay on the stage can be performed without being limited to only other players in the first virtual game space. Accordingly, it is possible to suppress the occurrence of a situation in which there are not enough players for multiplay. In addition, since other player characters can be displayed, the presence of other players can be visually clearly conveyed to the player.

(Configuration 2)

In Configuration 2 based on Configuration 1 above, by moving the own player character to any one stage object out of a plurality of stage objects placed in the first virtual game space, the game stage associated with the stage object may be selected in the first virtual game space.

According to the above configuration, the action of the player character that the player character moves to the stage object is made. Accordingly, it is made easier to visually grasp which player has selected which stage.

(Configuration 3)

In Configuration 3 based on Configuration 1 above, when shifting to the second mode, the connection to the first other game apparatus group in the first mode may be cancelled.

According to the above configuration, each time the player chooses to play a predetermined stage, matching is performed. Accordingly, it is possible to increase opportunities to meet various players.

(Configuration 4)

In Configuration 4 based on Configuration 1 above, if, in the first mode, the player of the game apparatus and a predetermined player out of players of the other game apparatuses included in the first other game apparatus group select the same stage and the stage selection process for both players is executed within a predetermined period of time, the game apparatus may be connected to the second other game apparatus group in which another game apparatus for the predetermined player is included, in the second mode.

According to the above configuration, players who have selected a predetermined stage at close timings can be included in the same communication group. Accordingly, the timings when these players start playing the stage can be close to each other. Therefore, each player can be provided with an opportunity to act together with another player from the start of stage play.

(Configuration 5)

In Configuration 5 based on Configuration 1 above, the computer of the game apparatus may shift to the first mode if a predetermined stage end condition is satisfied in the second mode; when the game apparatus shifts from the second mode to the first mode, the computer of the server may execute the first matching process with a third other game apparatus group in which another game apparatus not included in the first other game apparatus group can be included, as an object to be matched for the game apparatus; and the computer of the game apparatus may connect the game apparatus and a new first other game apparatus group determined by the first matching process with the third other game apparatus group as an object to be matched.

According to the above configuration, when a stage is ended, the first matching process is performed again, so that it is possible to move to the first virtual game space in a state of being connected to a game apparatus group different from the other game apparatus group connected before the start of the stage. Therefore, it is possible to increase opportunities to meet various players.

(Configuration 6)

In Configuration 6 based on Configuration 5 above, if, in the second mode, timings when the player of the game apparatus and a predetermined player out of players of the other game apparatuses included in the second other game apparatus group clear the stage are included within a predetermined period of time, the game apparatus may be connected to the first other game apparatus group in which a game apparatus of the predetermined player is included, in the first mode.

According to the above configuration, if the timings when a plurality of players playing the same stage clear the stage are close to each other, these players are included in the same communication group, which can result in moving to the same first virtual game space.

(Configuration 7)

In Configuration 7 based on Configuration 1 above, world information defining a plurality of different virtual worlds that can be displayed as the first virtual game space may be stored in the game system, and the computer of the game apparatus may execute a world movement process for moving from a first virtual world to a second virtual world in response to an operation by the player of the game apparatus while the first virtual game space corresponding to the first virtual world is displayed. When the world movement process is executed, the computer of the game apparatus may cancel the connection to the first other game apparatus group connected at that time, and may connect the game apparatus and a new first other game apparatus group including another game apparatus on which the first virtual game space corresponding to the second virtual world is displayed, on the basis of a result of the first matching process performed by the server in response to the world movement process.

According to the above configuration, matching is performed each time the player moves between multiple existing worlds. Accordingly, it is possible to provide an opportunity to meet various players.

According to the present disclosure, the presence of other players can be visually conveyed, and the occurrence of a situation in which there is a shortage of players for multiplay when playing a stage can be suppressed.

DETAILED DESCRIPTION OF NON-LIMITING EXAMPLE EMBODIMENTS

Figure 1:
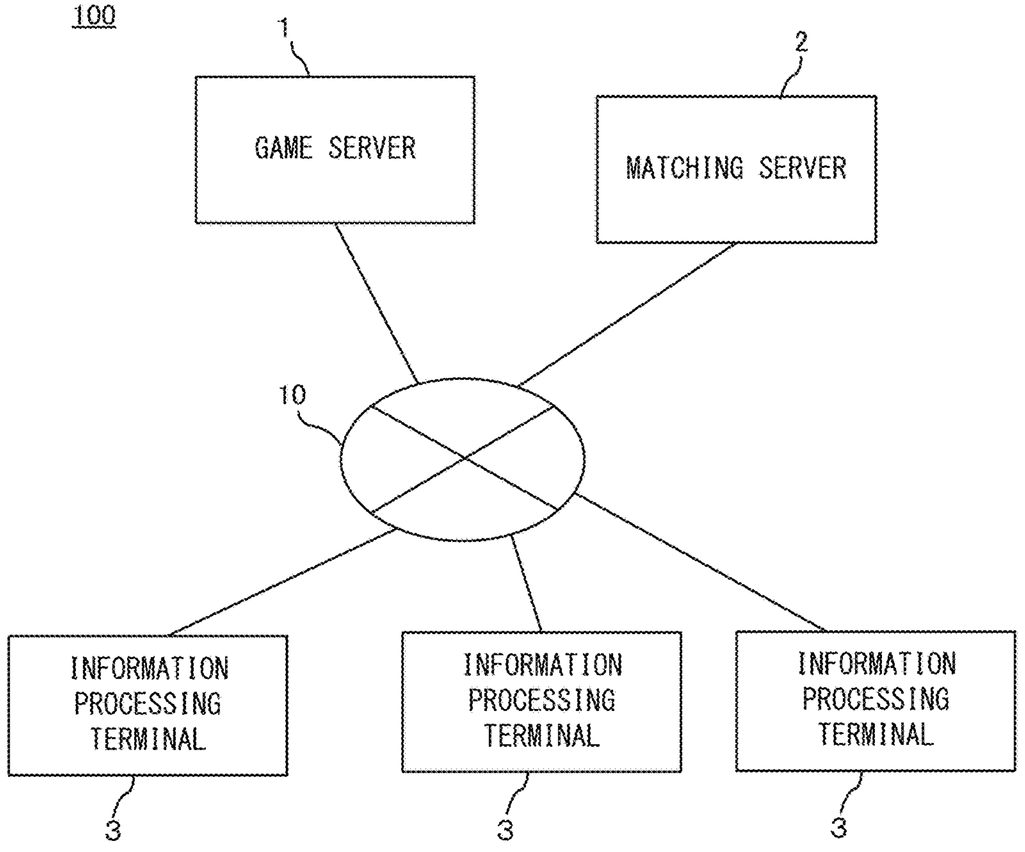
FIG. 1 is a schematic diagram showing a non-limiting example of the entire configuration of a game system according to an exemplary embodiment.

Hereinafter, one exemplary embodiment of the present disclosure will be described. FIG. 1 is a schematic diagram showing the entire configuration of an information processing system (game system) according to the exemplary embodiment. An information processing system 100 of the exemplary embodiment includes a game server 1, a matching server 2, and a plurality of information processing terminals 3. The game server 1, the matching server 2, and each information processing terminal 3 are configured to be able to communicate with each other via a network 10 such as the Internet. In the exemplary embodiment, with such a configuration, information processing is executed. Hereinafter, a description will be given with game processing as an example of the information processing. Specifically, it is assumed as an example that a game program is installed on the information processing terminal 3 and the game processing is executed while the information processing terminal 3 is communicating with the game server 1 as necessary.

[Hardware Configurations of Game Server and Matching Server]

Figure 2:
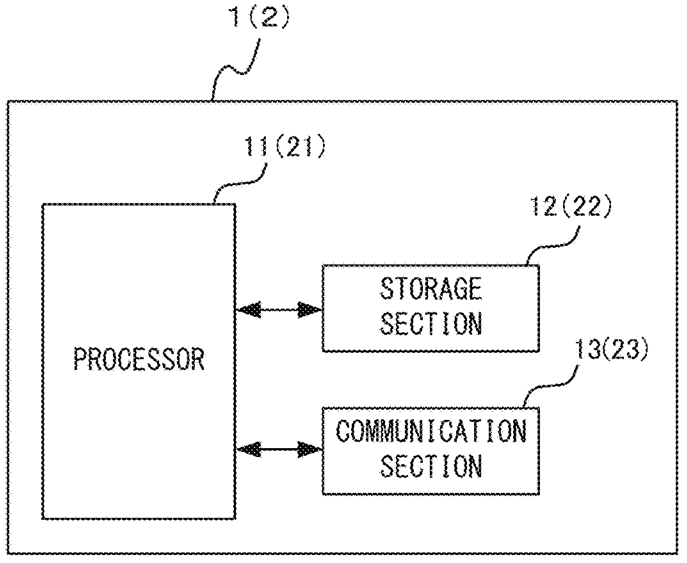
FIG. 2 is a block diagram showing a non-limiting example of the hardware configurations of a game server 1 and a matching server 2.

Next, the hardware configurations of the game server 1 and the matching server 2 will be described. In the exemplary embodiment, it is assumed that the hardware configurations of the game server 1 and the matching server 2 are the same. FIG. 2 is a block diagram showing the hardware configurations of the game server 1 and the matching server 2. In FIG. 2, the reference characters in parentheses denote components in the matching server 2. In addition, in the following, the game server 1 and the matching server 2 are sometimes referred to collectively as server. Each server includes at least a processor 11 (21), a storage section 12 (22), and a communication section 13 (23). The processor section executes various programs for controlling each server. In the storage section, various programs to be executed by the processor section and various kinds of data to be used by the processor section are stored. The communication section connects to a network by means of wired or wireless communication and transmits/receives predetermined data to/from each information processing terminal 3 or another server. In the exemplary embodiment, an example in which there is one game server 1 and there is one matching server 2 is illustrated, but each server may be a single server or may be configured as a group of servers that perform distributed processing.

[Hardware Configuration of Game Apparatus]

Next, the information processing terminal 3 will be described. The information processing terminal 3 is, for example, a smartphone, a stationary or hand-held game apparatus, a tablet terminal, a mobile phone, a personal computer, a wearable terminal, or the like. In the exemplary embodiment, a stationary game apparatus (hereinafter, referred to simply as game apparatus) will be described as an example of the information processing terminal 3.

Figure 3:
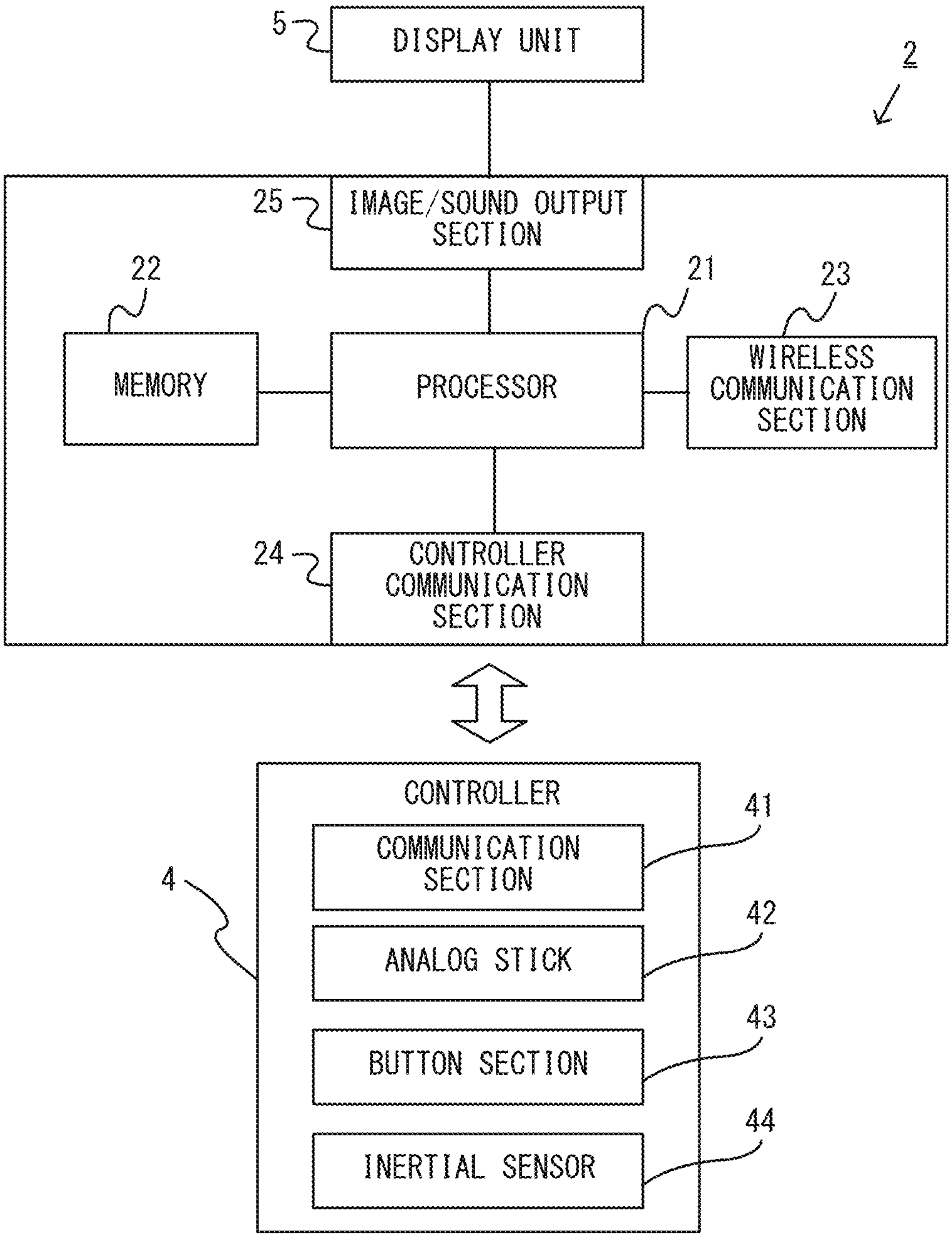
FIG. 3 is a block diagram showing a non-limiting example of the hardware configuration of a game apparatus 3.

FIG. 3 is a block diagram showing an example of the hardware configuration of a game apparatus 3 according to the exemplary embodiment. In FIG. 3, the game apparatus 3 includes a processor 31. The processor 31 is an information processing section for executing various types of information processing to be executed by the game apparatus 3. For example, the processor 31 may be composed only of a CPU (Central Processing Unit), or may be composed of a SoC (System-on-a-chip) having a plurality of functions such as a CPU function and a GPU (Graphics Processing Unit) function. The processor 31 performs the various types of information processing by executing an information processing program (e.g., a game program) stored in a storage section 32. The storage section 32 may be, for example, an internal storage medium such as a flash memory and a dynamic random access memory (DRAM), or may be configured to utilize an external storage medium mounted to a slot that is not shown, or the like.

The game apparatus 3 also includes a wireless communication section 33 for the game apparatus 3 to perform wireless communication with another game apparatus 3 or the above server. As this wireless communication, for example, internet communication or short-range wireless communication is used.

The game apparatus 3 also includes a controller communication section 34 for the game apparatus 3 to perform wired or wireless communication with a controller 4.

Moreover, a display unit 5 (for example, a television or the like) is connected to the game apparatus 3 via an image/sound output section 35. The processor 31 outputs an image and sound generated (for example, by executing the above information processing) to the display unit 5 via the image/sound output section 35.

Next, the controller 4 will be described. The controller 4 includes at least one analog stick 42 which is an example of a direction input device. The analog stick 42 can be used as a direction input section with which a direction can be inputted. By tilting the analog stick 42, a user is allowed to input a direction corresponding to the tilt direction (also input a magnitude corresponding to the tilt angle). In addition, the controller 4 includes a button section 43 including various operation buttons. For example, the controller 4 may include a plurality of operation buttons on a main surface of the housing.

Moreover, the controller 4 includes an inertial sensor 44. Specifically, the controller 4 includes an acceleration sensor and an angular velocity sensor as the inertial sensor 44. In the exemplary embodiment, the acceleration sensor detects the magnitudes of accelerations along predetermined three axial directions. In addition, the angular velocity sensor detects angular velocities about predetermined three axes.

The controller 4 also includes a communication section 41 for performing wired or wireless communication with the controller communication section 34. The content of a direction input to the analog stick 42, information indicating the press state of the button section 43, and various detection results by the inertial sensor 44 are repeatedly outputted to the communication section 41 and transmitted to the game apparatus 3 at appropriate timings.

[Outline of Information Processing in Exemplary Embodiment]

Next, an outline of operation of information processing according to the exemplary embodiment will be described. In the exemplary embodiment, a description will be given assuming processing of a game played by a player operating a player character object (hereinafter referred to as player character) that exists in a virtual space, as an example of the information processing. More specifically, in the exemplary embodiment, a description will be given assuming a side-scrolling type jump-action game (hereinafter referred to as "this game"). In this game, a virtual space called a "stage" which is a main stage of play is prepared. For the stage, a start point and a goal point are set. Various enemy characters and obstacles and various gimmicks such as jump stands and pitfalls are placed between the start point and the goal point. This game is a game in which the player character is caused to reach the goal point while defeating or avoiding these enemy characters, etc. The stage is sometimes called a "course", a "round", etc., depending on the game.

Figure 4:
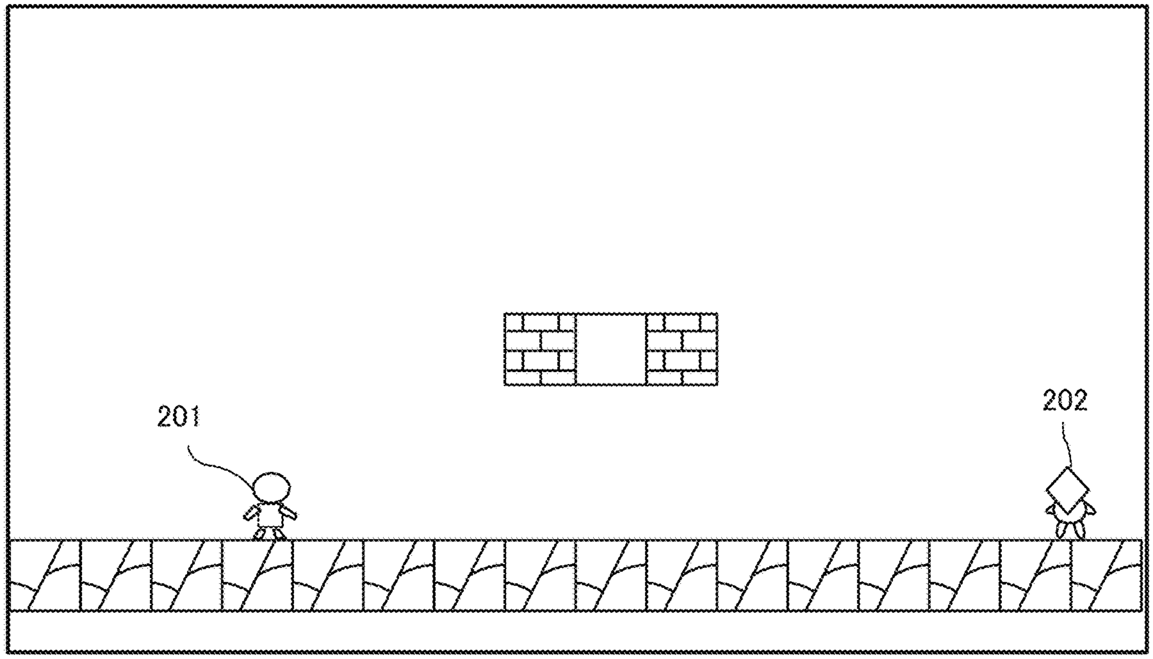
FIG. 4 shows a non-limiting example of a stage screen.

FIG. 4 shows an example of a game screen (hereinafter referred to as "stage screen") while the stage is being played. In the example in FIG. 4, a part of the stage configured as a virtual space that is horizontally long as a whole, is displayed. FIG. 4 is an example of a screen near the start point, that is, a screen immediately after the start of play of the stage. In FIG. 4, a player character 201 and an enemy character 202 are displayed. In addition, various terrain objects such as blocks are also displayed. In this stage, the start point is set near the left end of the stage, and the goal point is set near the right end of the stage. Therefore, as overall game progress, the stage is configured such that the player character 201 advances toward the right direction of the screen. In such a stage screen, the player operates the player character 201 to move the player character 201 toward the goal point. As the player character 201 moves, another location in the stage is displayed as a stage screen. When the player character 201 reaches the goal point, the stage is cleared.

[World Map]

Figure 5:
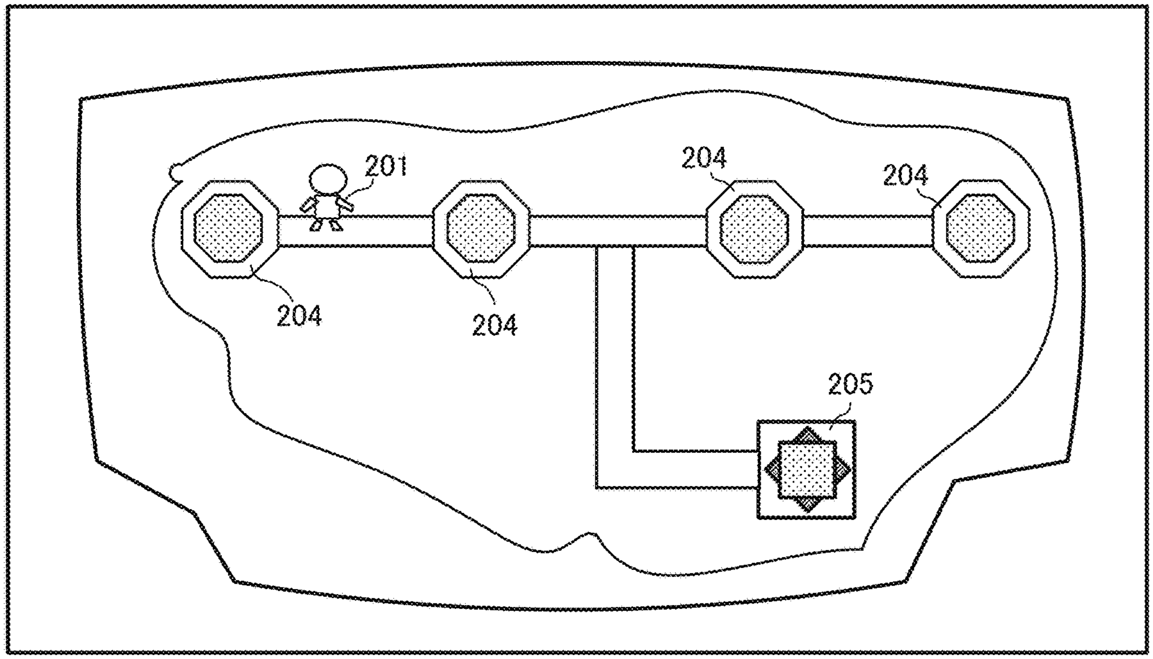
FIG. 5 shows a non-limiting example of a world map screen.

In this game, a plurality of the stages are prepared. Prior to playing each stage, a screen called a "world map screen" is displayed as a screen having a function to allow the player to select a stage to be played. FIG. 5 shows an example of the world map screen. In FIG. 5, a screen showing a "world", which is a virtual space, in a bird's eye view is displayed. The virtual space may be a two-dimensional space or a three-dimensional space. In addition, the rendering methods and the display forms of the "world" and the "stage" may be different. For example, the stage may be rendered with orthographic projection from the front direction, and the world may be rendered by taking an image of the world from above. In the world, a plurality of stage objects 204 each of which plays a role like the entrance to the stage are placed. In addition, although described later, a portal object 205 for moving to another world is also placed. In the world map screen, the player character 201 is also displayed. The player can move the player character 201 in the world map screen by operating the controller 4. In addition, by moving the player character 201 such that the player character 201 comes into contact with any one stage object 204, the player can select the stage corresponding to the stage object 204. Then, by performing a predetermined operation for staring stage play (hereinafter, referred to as "stage start operation"), the player can start playing the stage corresponding to the stage object 204. Specifically, when a stage start operation is performed, a predetermined representation is displayed, and then the screen switches to a stage screen in which the player character 201 is placed at the start point of the stage.

[Relationship Between World and Stage]

In this game, as for the above "world", a plurality of worlds are prepared. In this game, as an example, there are five worlds (World 1 to World 5), and each world is assumed to include four stages. In the world map screen, any one of the five worlds is displayed.

Here, each world is designed in terms of its appearance to have a world view based on a predetermined theme. The same applies to the stages belonging to each world. Examples of worlds include a green world, a fire world, an ice world, etc. For a green world, a world map with a green-based design in which many plant objects are placed is prepared, and for a fire world, a world map with a red-based design in which volcanoes and lava are placed is prepared.

In this game, not all stages can be freely played in all worlds from the beginning, and initially, the worlds that can be moved to and the stages that can be played are limited. Then, by clearing a stage that can be played, another stage is released. For example, initially, only Stage 1 of World 1 can be played, but once Stage 1 is cleared, Stage 2 of World 1 is released and can be played. Then, by clearing all the stages in World 1, World 2, which is defined as the next world in advance, is released.

To move from one world to another world, the player first moves the player character 201 onto the portal object 205 in the world map screen. Then, by performing a predetermined operation (hereinafter referred to as world movement operation), the player can move the player character 201 to another world associated with the portal object 205. For example, if a world movement operation is performed on the portal object 205 associated with World 2 in a world map screen of World 1, the player character 201 moves to World 2, and the screen switches to a world map screen of World 2.

The player can repeatedly play a stage that has already been released, by performing the above stage start operation. Also, the player can freely move between worlds that have already been released. For example, it is possible to move from World 2 to World 1.

In this example, the portal object 205 for each world that cannot be moved to yet and the stage object 204 for each stage that cannot be played yet are also displayed on the world map screen, and it is possible to move the player character 201 thereto. However, it is assumed that the world movement operation and the stage start operation are not accepted therefor. In this regard, in another exemplary embodiment, the player character 201 may be unable to move to the portal object 205 and the stage object 204 for each world and each stage that have not been released.

As described above, the basic flow of game progress in this game is that the player selects a stage to be played, on the world map screen, and a stage that has not been released is released by clearing the stage. Then, by clearing all the stages in a world, the next world is released, and by clearing the stages in each world, worlds are released one after another, with the aim of clearing the final stage in the final world.

In the following description, when each stage is shown so as to be distinguished from the other stages, the stage is shown by a format of "stage 'world number'-'stage number'". For example, Stage 1 in World 1 is shown as "Stage 1-1", and Stage 1 in World 2 is shown as "Stage 2-1"

[Online Play Element]

The flow of the basic game progress of this game is as described above, and the game can basically be played as if it were a single-player game. In addition to the above element, this game also has an online play element that allows the game to be played when a connection to the above server or other game apparatuses 3 is made.

Hereinafter, the online play element of this game will be described. First, the overall network configuration will be described. The basic network configuration is as shown in FIG. 1 above. This game provides a game that uses a communication group structure in a so-called MO (Multiplayer Online) type online game. Specifically, a communication group corresponding to each of the above worlds (hereinafter referred to as world room) and a communication group corresponding to each stage (hereinafter referred to as stage room) can be created and managed as appropriate. In other words, a virtual space corresponding to each of the above worlds and a virtual space corresponding to each stage are prepared, and a predetermined number of players connect to the virtual spaces. The world room is sometimes called a "lobby", etc., in other games.

In addition, for each of the world rooms and the stage rooms, a maximum number of players that can enter the room is provided. As an example, in this game, up to 30 players can enter each world room. In addition, up to four players can enter one stage room. In this game, as described above, a room is prepared for each world and for each stage, and a plurality of rooms can exist in parallel for each world room and for each stage room. In this game, as an example, a connection manner in which communication is performed via a server (client-server method) is used for each world room, and a manner in which the game apparatuses 3 are connected by a P2P (Peer to peer) communication method is used for each stage room.

Figure 6:
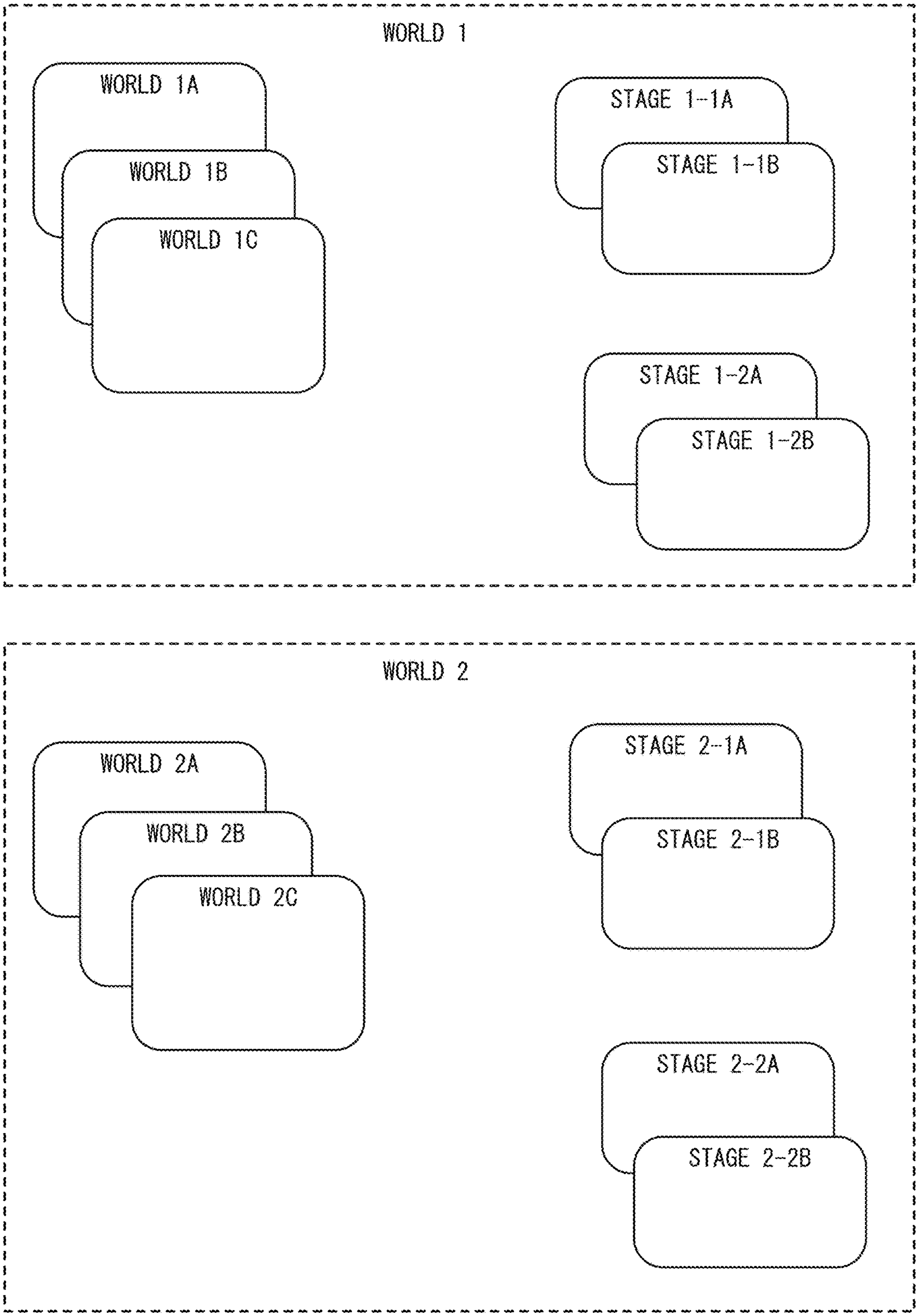
FIG. 6 is a non-limiting example diagram for describing the concept of a "room" in the exemplary embodiment.

FIG. 6 shows an example of the configuration of the above communication groups, that is, the world rooms and the stage rooms. In the example in FIG. 6, three world rooms, World Room 1A, World Room 1B, World Room 1C, coexist for World 1, three world rooms, World Room 2A, World Room 2B, and World Room 2C, coexist for World 2. In addition, as for the stage rooms, FIG. 6 shows that two rooms corresponding to each of Stages 1-1, 1-2, 2-1, and 2-2 coexist. That is, Stage Room 1-1A and Stage Room 1-1B corresponding to Stage 1-1 coexist, Stage Room 1-2A and Stage Room 1-2B corresponding to Stage 1-2 coexist, Stage Room 2-1A and Stage Room 2-1B corresponding to Stage 2-1 coexist, and Stage Room 2-2A and Stage Room 2-2B corresponding to Stage 2-2 coexist. Therefore, in the example in FIG. 6, a total of six world rooms and a total of eight rooms exist in parallel.

An increase or decrease in the number of rooms is controlled by the server according to the number of players in a room. Specifically, a world room or stage room is created in response to the above world movement operation or stage start operation or the like as appropriate. In addition, a world room or stage room in which the number of players reaches 0 is deleted as appropriate.

Next, the rough flow of operations, etc., from the start-up of the game to the start of stage play will be described in view of the "room" element described above. First, when the player starts up the game, a predetermined login process is performed, and a process of loading saved data, etc., are performed. After that, the player character "enters" a predetermined world room, which means to join a predetermined communication group and establish a connection to an other game apparatus group in the same communication group.

Figure 7:
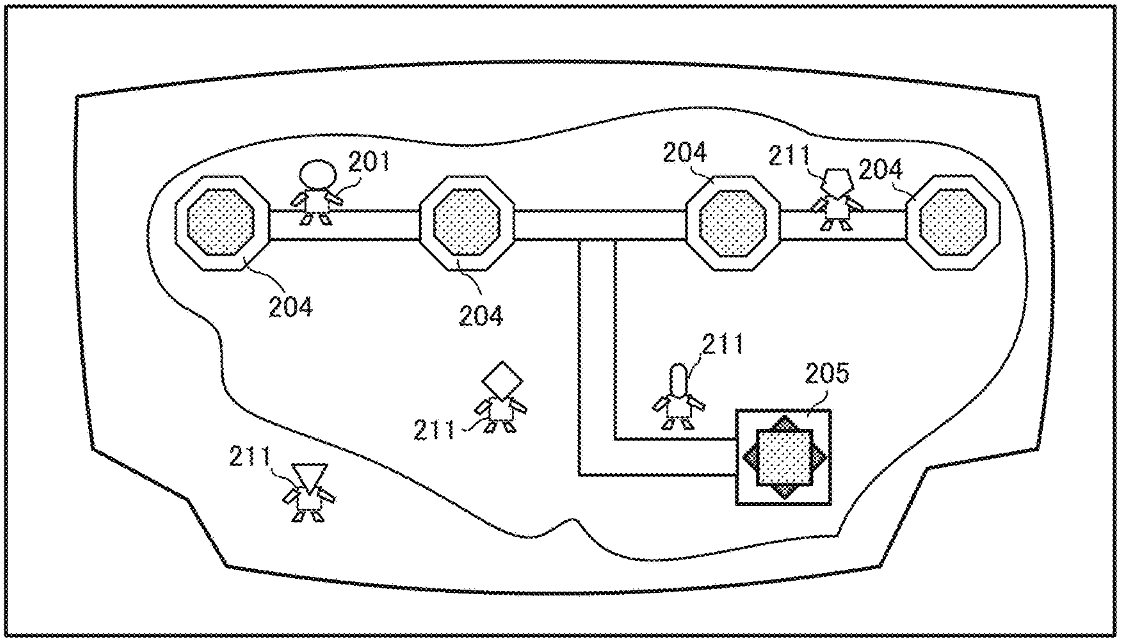
FIG. 7 shows a non-limiting example of the world map screen.

After the predetermined world room is entered, the above world map screen is displayed. As described above, the player can move the player character 201 in the world map screen. FIG. 7 shows an example of the world map screen when the player enters a world room in which a predetermined number of players have already entered. In this screen, in addition to the player character 201, a plurality of player character objects 211 operated by the other players who have entered the world room are also displayed. In addition, these player character objects 211 moving on the world map are displayed in real time in response to operations of the other players. In the following description, player character objects operated by other players who are in the same room (world room or stage room) are collectively referred to as "remote characters". Regarding the display of remote characters, all remote characters in the same world room may be displayed, or only some or a part of the remote characters may be displayed.

In the exemplary embodiment, the player character 201 and the remote characters are characters whose appearances are different to the extent that these characters are recognizable as different characters. This is because if a plurality of characters having substantially the same appearance are displayed at the same time, it is difficult for the player to grasp which character is the player character 201 operated by the player. In the exemplary embodiment, after a connection to an other game apparatus group is established and the player enters a predetermined world room, the above world map screen is displayed. However, the world map screen may be displayed without waiting for the connection to the other game apparatus group to be established, and remote characters may be caused to appear after the connection is established. Accordingly, the player starts operating the player character without waiting for the connection to be established, so that the game experience is improved.

[Entry to Stage Room]

On such a world map screen, if the player desires to play a certain stage, the player performs the above stage start operation. That is, on the world map screen, the player moves the player character 201 onto a predetermined stage object 204 and presses a predetermined button. With such an operation, the player "exits" the world room in which the player is currently present. The exit means that a connection to an other game apparatus group in a communication group to which the player has belonged so far is cancelled. In this case, a connection to an other game apparatus group in the same world room is cancelled. Then, the player enters a predetermined stage room corresponding to the selected stage. The method of determining the stage room to be entered will be described later. Then, the screen switches to the stage screen in which the player character 201 is placed at the start point, and stage play begins.

[Online Element in Stage Play]

Figure 8:
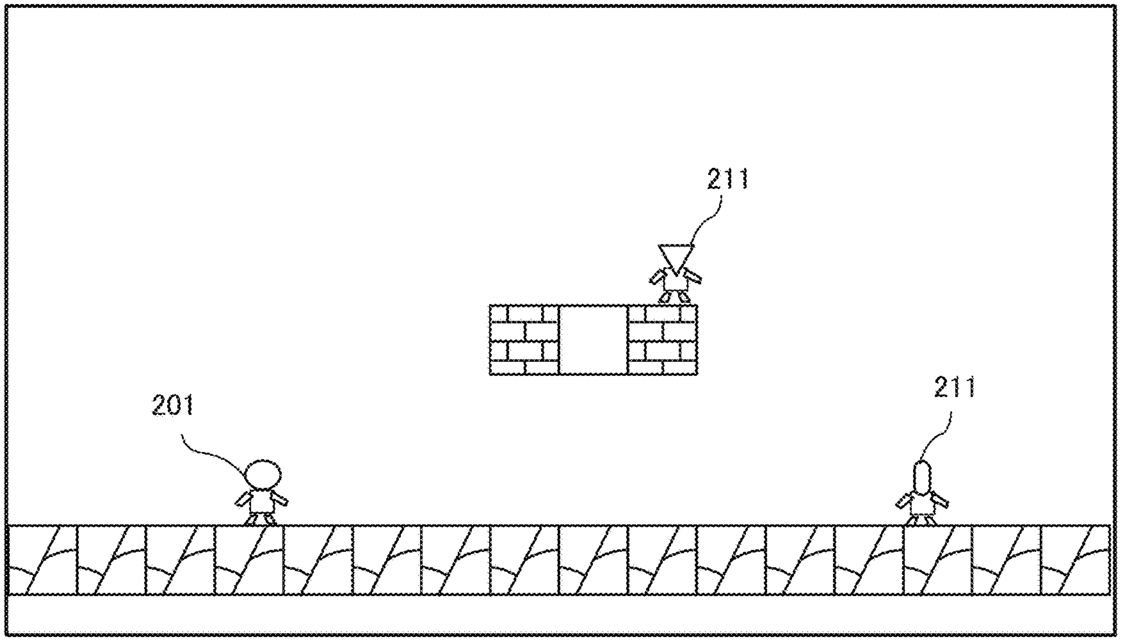
FIG. 8 shows a non-limiting example of the stage screen.

Next, an online element in the above stage play will be described. Here, a description will be given assuming the case where the player enters a stage room in which two other players have already entered, as an example. FIG. 8 shows an example of the stage screen when the player enters such a stage room. In this case, as in the case of the above world map screen, the remote characters, which are other player characters operated by the other players, can be displayed on the stage screen in the game apparatus 3 operated by the player. In the example in FIG. 8, two remote characters 211 are displayed in addition to the player character 201. Since the other players have entered the room and have started stage play earlier than the player, the remote characters 211 are each at a position slightly further ahead toward the goal point than the start point.

In this game, a remote character displayed in a stage room moves in response to an operation by another player, but does not directly interfere with and affect game play executed on the game apparatus 3 of the player. Specifically, game apparatuses 3 connected to a certain stage room basically share only the position information of the player character 201 of each player. On the other hand, the states, position information, etc., of other objects such as enemy characters are not shared. For example, in each game apparatus 3, a collision determination process with stage objects, etc., in stage play is performed only for the player character 201 in each game apparatus, and no collision detection process is performed for the remote characters. Therefore, even if the player character 201 overlaps with the position of a remote character, it will result in the player character 201 moving through the remote character without colliding with the remote character. Also, if a remote character overlaps with an enemy character, no collision determination or the like is performed between the remote character and the enemy character, resulting in the enemy character moving through the remote character. Also, for example, when the player character 201 defeats an enemy character A, the state of the enemy character A is not reflected in another game apparatus 3. In the other game apparatus 3, if the other player of this other game apparatus 3 has not defeated the enemy character A, the enemy character A is controlled in a state where the enemy character A still exists. That is, the progress of stage play itself is managed individually on the game apparatus 3 of each player, and is controlled such that, if there is a remote character in this case, only display of the remote character is performed. Therefore, each player can basically play the stage as if it were a single-player game, without being affected by the actions of the other players and without interfering with the actions of the other players. In other words, each player can obtain a play feeling and a game experience that the player can be aware of the presence of remote characters, i.e., other players, while advancing the game alone.

As described above, each player can individually advance the game without being affected by the other players. Therefore, the game is not a game in which stage play cannot be started unless all four players are present, and stage play can be started even when there is only one player in the stage room. After that, other players can enter the room in the middle of the game until the number of players in the room reaches four which is the maximum number. For example, if a player B enters the room when a player A has advanced to about one-third of the stage, the player character of the player B starts moving from the start point. That is, the player B starts stage play in a state where the player A is present at a somewhat advanced position. The player A can continue to play without the own play being disturbed by the entry of the player B.

[Cooperation Element]

As described above, basically, each player can individually advance the game without being affected by other players. However, this game has a cooperative play element in the following respects. Specifically, in this game, it is possible to affect other players in terms of "revival assistance" and "item passing".

First, as for "revival assistance", it is assumed that, for example, when the player character comes into contact with an enemy character, this is treated as a "mistake" if the player is assumed to perform single play offline, and a remaining player character is lost. In this case, if the player is playing while connected online in this game, this is not treated as a mistake, and the player character changes into a character like a "ghost" for a predetermined period of time. Then, if, during the predetermined period of time, the position of any remote character overlaps the position of the "ghost", that is, any remote character comes into contact with the ghost, this is not treated as a "mistake", and the player character can be revived. Therefore, for example, if the remote characters move together to a certain extent, there is an advantage that it is easier to recover when a mistake is made while still playing the game as if it were a single-player game, which is not available in a complete single-player game. In addition, the player character changes into the "ghost" in a situation in which the play stops due to being treated as a "mistake" in the case of single play, so that the play by the player is not interfered with.

As for "item passing", an item owned by the player character can be "put" on the stage by performing a predetermined operation. Then, when a remote character comes into contact with this item, the remote character can acquire the item. That is, it is possible to pass a predetermined item to the remote character. This allows indirect cooperative play in which a remote character is helped by passing a useful item thereto while advancing the game as if it were a single-player game.

By having the above cooperative play element, there can be room for the player to cooperate with other players in a certain situation. Accordingly, a situation can be created in which the game is basically advanced as single play, but if a plurality of players enter the stage room through matching, it becomes easier to cooperate with other players.

[Exit from Stage Room]

Next, exit from a stage room will be described. As described above, if the player character reaches the goal point, the stage is cleared. The player (game apparatus 3) whose player character has reached the goal exits the stage room regardless of the progress statuses of other players, and enters a predetermined world room. Although described in detail later, at this time, the player does not necessarily return to the world room in which the player entered before starting stage play, but may enter a world room that is in the same world as the original world but is a different room. For example, if the player moves from World Room 1A to a predetermined stage room and exits the room as a result of clearing the stage, the player may enter World Room 1A, or may enter World Room 1B or World Room 1C.

In addition to clearing the stage as described above, the stage room can be exited by voluntary exit from a pause menu or by satisfying a game-over condition. In the case of voluntary exit, for example, the pause menu is displayed by pressing a pause button during stage play, and by selecting a "quit" item shown in the menu, the player can exit the stage room at that time and move to a predetermined world room. In the case of exit due to game over, for example, when the game-over condition is satisfied due to the remaining number of player characters reaching 0 without receiving the revival assistance as described above, the player is forced to exit the stage room at that time, and enters a predetermined world room.

[Movement Between Worlds]

Next, the case of moving from the current world to another world on the world map screen will be described. As described above, by moving the player character 201 onto a portal object 205 and performing a world movement operation, the player character 201 can be moved to another world associated with the portal object 205. In this case, the player exits the world room in which the player is currently present, and enters another world room. For example, it is assumed that when the player desires to move from World 1 to World 2, in a state where the player is in World Room 1A, the player performs a world movement operation to move from World 1 to World 2. In this case, the player exits World Room 1A, and may enter World Room 2A, or may enter World Room 2B. The method of determining the room to be entered will be described later.

Figure 9:
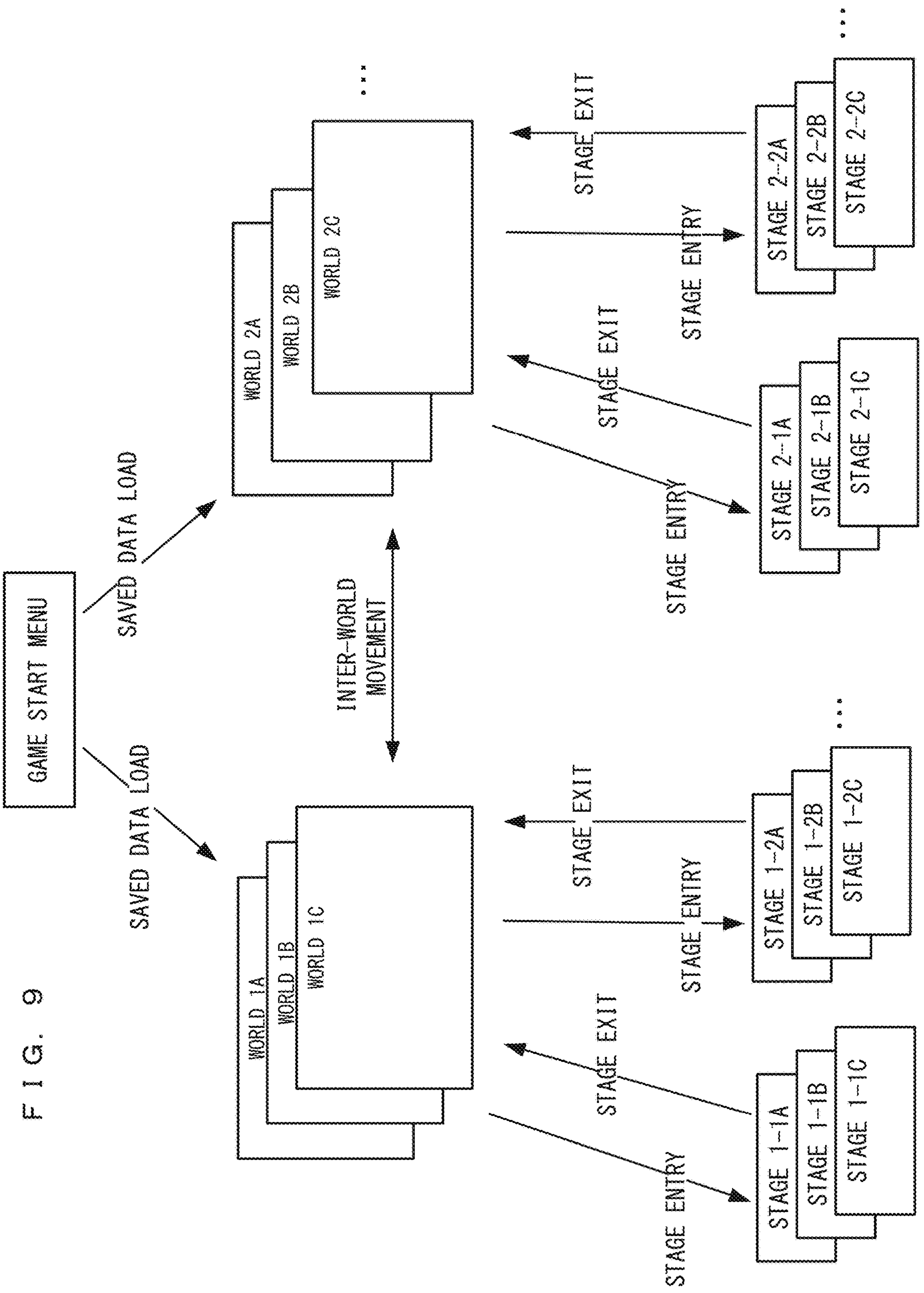
FIG. 9 is a non-limiting example diagram for describing the concept of movement of the "room" in the exemplary embodiment.

The relationship between entering and exiting each room as described above can be summarized as shown in FIG. 9. After the game starts, entry to a predetermined world room occurs on the basis of saved data. When a world movement operation is performed on the world map screen, exit from the world room in which the player is currently present and entry to a world room that is the movement destination (hereinafter sometimes referred to as inter-world movement) occur. When the player performs a stage entry operation on the world map screen, exit from the world room in which the player is currently present and entry to a predetermined stage room related to the designated stage, occur. When a condition for exiting a stage is satisfied, for example, when the stage is cleared, exit from the stage room and entry to a predetermined world room related to the world to which the stage belongs, occur.

[Matching Process]

As described above, the player can perform an operation to enter a world room or a stage room. In response to this operation, a process of entering the world room or stage room is performed, and the game apparatus 3 of the player is connected to the other game apparatuses (players) in the room in which the player has entered, so as to enable communication therewith. Here, as described above, a plurality of world rooms and a plurality of stage rooms can exist in parallel for the same world and the same stage. The method of determining the world room or the stage room to be entered, in other words, the method of determining the game apparatuses (players) to be included in each communication group described above, will be described below. In the following, a function of selecting the room to be entered and entering the room in the exemplary embodiment is referred to as "matching". As will become clear in the following description, more precisely, control is performed in which a predetermined player who matches a condition is searched for, and if this player has already entered a room, this room is determined as the room to be entered. If this player has not entered any room yet, control is performed in which a new room is created, and the player enters this room together with this player.

Figure 10:
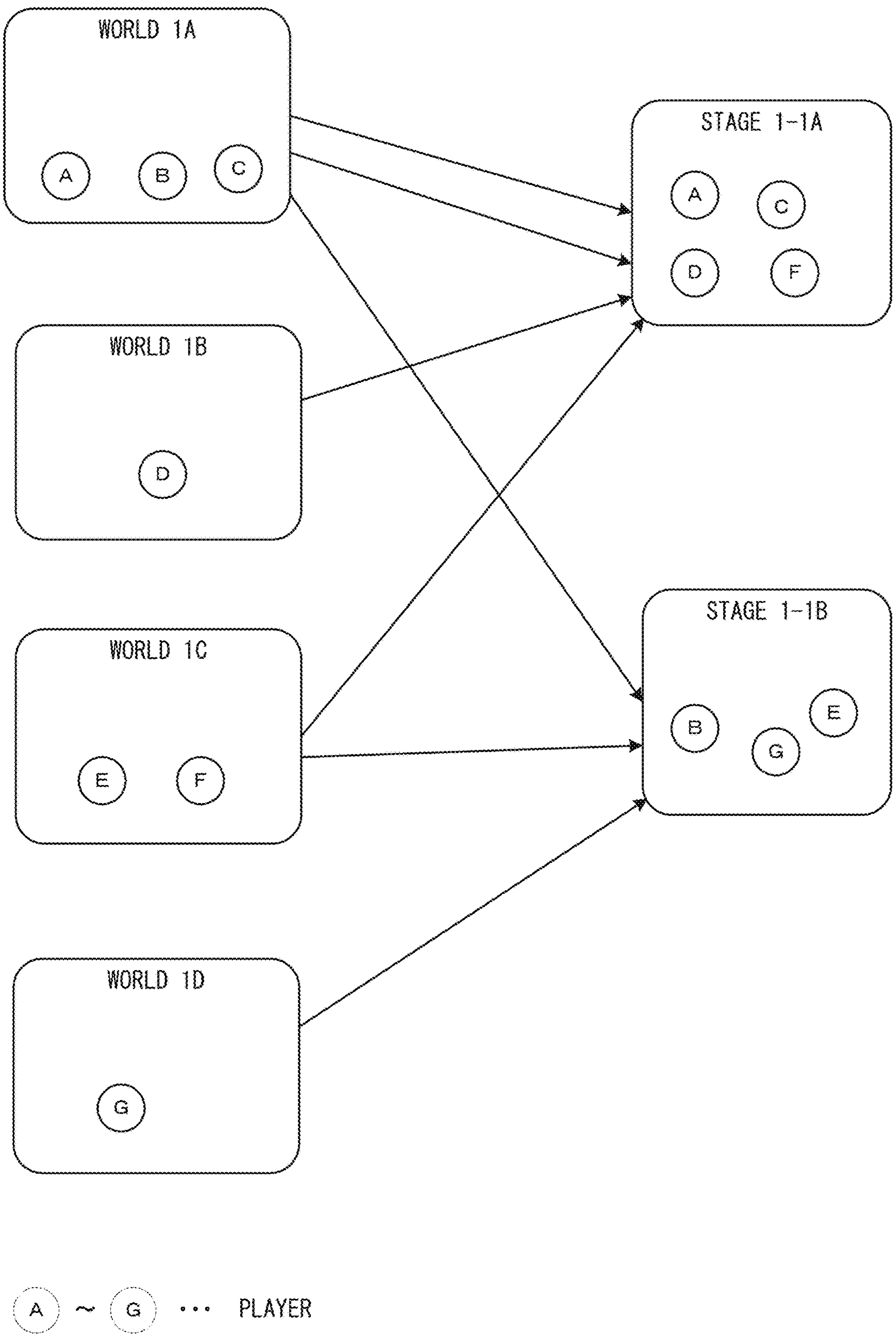
FIG. 10 is a non-limiting example diagram for describing entry to a stage room.

First, the range of players to be matched will be described. In this game, when determining the stage room to be entered, the targets to be matched are not limited to the players in the same world room, and the players in the other world rooms related to the same world are also included in the targets to be matched. In other words, matching is performed with, as the targets to be matched, not only the other players in the world room in which the player having performed the stage start operation is present, but also all other players who have selected the same stage in other world rooms. FIG. 10 shows an example of a matching result when entering a stage room. FIG. 10 assumes that a stage start operation for playing Stage 1-1 is performed on the world map screen of World 1. The example in FIG. 10 shows four world rooms that are World Room 1A to World Room 1D, and two stage rooms that are Stage Rooms 1-1A and 1-1B. In addition, a plurality of players who intend to play Stage 1-1 have entered the four world rooms in a dispersed manner. Specifically, three players are in World Room 1A, one player is in World Room 1B, one player is in World Room 1D, and two players are in World Room 1C. In this situation, for example, each player performs a stage start operation for Stage 1-1. In this case, for example, for a player A who is in World Room 1A, matching is performed with, as the targets to be matched, not only a player B and a player C who are in the same World Room 1A, but also a player D to a player G who are players in the other rooms of World 1. Similarly, for example, when considering World Room 1C, matching is not performed with only the player E and the player F as the targets to be matched, but matching is performed with all the players A to G as the targets to be matched. As a result, in the example in FIG. 10, Stage Room 1-1A is a stage room in which the player A and the player C who have been in World Room 1A, the player D who has been in World Room 1B, and the player F who has been in World 1C are matched. In addition, Stage Room 1-1B is a stage room in which the player B who has been in World Room 1A, the player E who has been in World Room 1C, and the player G who has been in World Room 1D are matched.

The reason why, in matching for a stage room, not only the players in one world room but also the players in the other world rooms are used as the targets to be matched, is as follows. First, in this game, in order to provide the game experience of playing the game as if it were a single-player game while feeling the presence of other players as described above, there is an aspect in which each stage room is desired to be filled with four players as much as possible. Meanwhile, the number of players that can enter a world room is limited, and is up to 30 in this example. In addition, there can be multiple stages that can be selected in one world room. Therefore, if a member to play a stage is selected from among only the players in one world room, it may be difficult to gather players in each stage room. For example, it is assumed that 10 players are in a world room with 5 selectable stages. In this case, it is conceivable that each player may select a different stage, but if so, a situation in which an individual stage room is filled with four players is unlikely to occur. Therefore, in the exemplary embodiment, in matching for a stage room, not only the players in the same world room, but also other players in the other world rooms who have selected the same stage are used as the targets to be matched. Accordingly, it is possible to create many stage rooms filled with four players.

The above limit of 30 players is only an example of the number of players in a world room, and the number of players may be set as appropriate according to the nature of the game. In this example, since a plurality of stages are included in one world, the number of players who can enter a world is set to be larger than the number of players who can enter a stage. That is, the maximum number of players who can be matched in a world room is set to be larger than the maximum number of players who can be matched in a stage room.

Next, an outline of control of matching in the exemplary embodiment will be described. In the exemplary embodiment, matching is performed such that the following results are obtained. As described above, there are multiple worlds and stages, and matching is performed for each world and each stage.

(Priority condition 1) The rooms to be entered are determined such that players who have selected the same world or stage as their movement destination at timings that are close to each other to some extent are likely to be in the same room.

(Priority condition 2) If the above priority condition 1 does not apply, for the world rooms, a room in which a larger number of players are present is preferentially selected. For the stage rooms, a room in which any other player has entered and for which the entry time of the other player is closest to the time when a stage start operation was performed is preferentially selected.

Next, an outline of the content of matching performed at each timing will be described.

[Case of Entering Stage Room]

First, matching for a stage room can be performed when a stage start operation is performed on the world map screen. As described above, as for matching for a stage room, matching is basically performed without limiting the targets to be matched to the players in the same world room. In this case, in the exemplary embodiment, matching is controlled such that players who are in the same world and whose timings of the stage entry operation are close to each other are likely to be in the same room as much as possible. In the exemplary embodiment, determination as to whether the "timings of the stage entry operation are close" is performed on the basis of the timing when the stage start operation was performed, that is, the timing when the world room was exited (timing when a request for matching was made). Specifically, matching is performed such that players whose difference in the timing is within a certain time are likely to be in the same room. For example, it is assumed that two players, a player A and a player B, are present in World Room 1A. In this case, it is assumed that when the player B sees the remote character operated by the player A enter Stage 1-1 on the world map screen, the player B immediately performs a stage entry operation for Stage 1-1 in order to follow the player A. Then, as a result of such an operation, the player B also performs a stage start operation for Stage 1-1 within 3 seconds after the player A performs a stage start operation for Stage 1-1. In this case, both players have selected the same stage, and the timings of their exit from the world room are quite close. More specifically, both the player A and the player B have performed the start operation for Stage 1-1 within a period of 3 seconds. In the exemplary embodiment, matching is performed such that the player A and the player B are likely to be in the same stage room when such a relationship is established. However, this only increases the possibility of being in the same stage room, and does not guarantee that these players will always be in the same room. For example, depending on the timing, the number of players in the stage room in which the player A has entered may reach the capacity of the stage room, and thus the player A and the player B may be assigned to different stage rooms even if the above relationship is established.

Next, the case where the above relationship in which the "timings of the stage entry operation are close" is not established, will be described. For example, it is assumed that a player C performs a stage start operation for Stage 1-1, and there is no other player who has performed a stage start operation for Stage 1-1 within a period of 10 seconds prior to this operation. In this case, another player who has most recently entered a stage room is searched for by further tracing back in past, and matching is performed such that the stage room in which this other player entered is preferentially selected as the room to be entered. In other words, matching is performed such that a stage room in which stage play by a certain player has not proceeded much after its start is preferentially selected. This makes it easier to meet other players when entering a stage room in which other players are present. In the exemplary embodiment, control is performed in which the past period to be traced back is widened stepwise. Specifically, first, the above search is made for a period of 10 seconds prior to the timing when the stage start operation was performed (more precisely, the timing when a request for matching was made). If there is no "stage room in which another player entered" within this period, the search is made for a period of 60 seconds before, and if there is no such stage within this period, the search is made for a period of 120 seconds before. As described above, the three periods to be traced back are provided, and if there is no "stage room in which another player entered" even when tracing back 120 seconds, matching is performed without considering this time factor. This also prevents the occurrence of a situation in which the room to be entered cannot be found no matter how long it takes, while taking into consideration the ease of meeting other players as described above.

Next, an outline of matching for a world room will be described. In this game, matching for a world room is performed in the following three cases.

(1) Case of exiting a stage room.

(2) Case of moving from one world to another world (world movement).

(3) Case of shifting to the world map screen for the first time after starting up the game.

First, the case of exiting a stage room will be described. As described above, if the player character reaches the goal point in stage play, the stage is cleared, the stage room is exited, and matching for a world room is performed. At this time, players who have reached the goal in the stage room at timings that are close to each other are likely to be in the same world room. As in the case of entering a stage, this matching is performed on the basis of the timing when the stage room is exited, in other words, the timing when a request for matching for a world room is made. That is, players who have exited the stage at close timings by clearing the stage are likely to enter the same world room.

[Merging Quota of World Room]

As described above, the number of players who can enter a world room is limited. Therefore, for example, it is assumed that a player A and a player B exit a stage room at timings close to each other, but the world room that is a candidate for entry is a world room for which only one more player is available. In this case, there is a possibility that only the player A enters the world room and another world room is selected as the room for the player B to enter. In consideration of such a point, in the exemplary embodiment, out of 30 players who can enter a world room, 20 players are set as a "normal quota" and 10 players are set as a "merging quota" such that players who have exited a room at close timings as described are likely to enter the same world room. Basically, if the number of players in a room reaches 20 or more, the room is treated as full and is excluded from the matching target. For example, it is assumed that if there is a world room in which the number of players is 18, four players exit a certain stage room at timings close to each other to some extent. In this case, it is assumed that the world room in which the number of players is 18 is selected as the room for a player A to enter. In such a case, matching is performed using a merging quota of two players so as to increase the possibility that the above four players enter this world room. As a result, when the four players enter this world room, 22 players are present in this world room. Then, control is performed such that this world room is treated as full, and is excluded from the matching target until the number of players in this world room decreases to 19 or less.

[Inter-World Movement]

Next, the case of inter-world movement will be described. In the exemplary embodiment, also, when moving from one world to another world, matching for a world room is performed each time. In this case as well, as in the above, matching is performed such that, for players who have designated the same world as the movement destination and whose timings of a world movement operation are close to each other to some extent, the same world room is likely to be selected as the entry destination. Therefore, for example, if a player B who has seen a player A move to World 2 in World Room 1A immediately performs a world movement operation to World 2, World Room 2A can be determined as the room for the player A and the player B to enter. As a result, it is possible for the player B to move after the player A, so to speak.

[Case of Entering World Room for First Time after Starting Up Game]

Next, the case of shifting to the world map screen for the first time after starting up the game will be described. For example, this case is a case where the world map screen is first displayed after login. In this case, matching is performed such that a world room in which the number of players is larger is preferentially selected. In the exemplary embodiment, it is assumed that after the game is started up, the world to be first moved to is determined on the basis of saved data. That is, the world in which the player was present last at the time of the last logout is determined as the movement destination.

[Details of Matching Control Processing in Exemplary Embodiment]

Hereinafter, the game processing in the exemplary embodiment will be described in more detail. First, the basic mechanism of a matching process in the exemplary embodiment will be described. In the exemplary embodiment, a matching request is transmitted from the game apparatus 3 (game application) and the game server 1 (game server program) to the matching server 2. This request includes various kinds of data necessary for matching. Hereafter, a set of data necessary for matching included in this request is referred to as a "ticket". In addition, for convenience of description, tickets transmitted from the game apparatus 3 are referred to as "normal tickets", and tickets transmitted from the game server 1 are referred to as "re-recruitment tickets".

[Normal Tickets]

First, a matching request from the game apparatus 3 side will be described. When an attempt to enter a world room or stage room is made in each game apparatus 3, the normal ticket is transmitted as a matching request to the matching server 2. In the matching server 2, a matching process is performed using the normal ticket included in the matching request received from each game apparatus 3, and each game apparatus 3 is notified of a matching result. On the basis of this notification, a process of establishing a connection to a predetermined game apparatus or the game server 1 is performed, that is, a process of entering the world room or stage room is performed.

[Re-Recruitment Tickets]

Next, a matching request from the game server 1 side will be described. In the exemplary embodiment, a matching request is also transmitted from the game server 1 to the matching server 2. This matching request is a request to fill up already created rooms with players, where the game server 1 manages the world rooms and stage rooms described above. For example, it is assumed that there is a world room in which 10 players are present. In order to fill such a world room with players, the above re-recruitment ticket is transmitted as a matching request from the game server 1 to the matching server 2. In the following description, a room that is associated with the re-recruitment ticket and is desired to be filled with players is referred to as "re-recruitment room". In the matching server 2, a matching process is performed using the above normal ticket and the re-recruitment ticket, and as a result, the re-recruitment room is filled up with players.

In the exemplary embodiment, up to 30 players can enter each world room. In a world room in which 20 players are present, the "normal quota" is filled as described above, and thus this world room is treated as full and is not filled up with players. That is, transmission of a re-recruitment ticket for such a world room is not performed. This is to make the above-described "merging quota" function.

Figure 11:
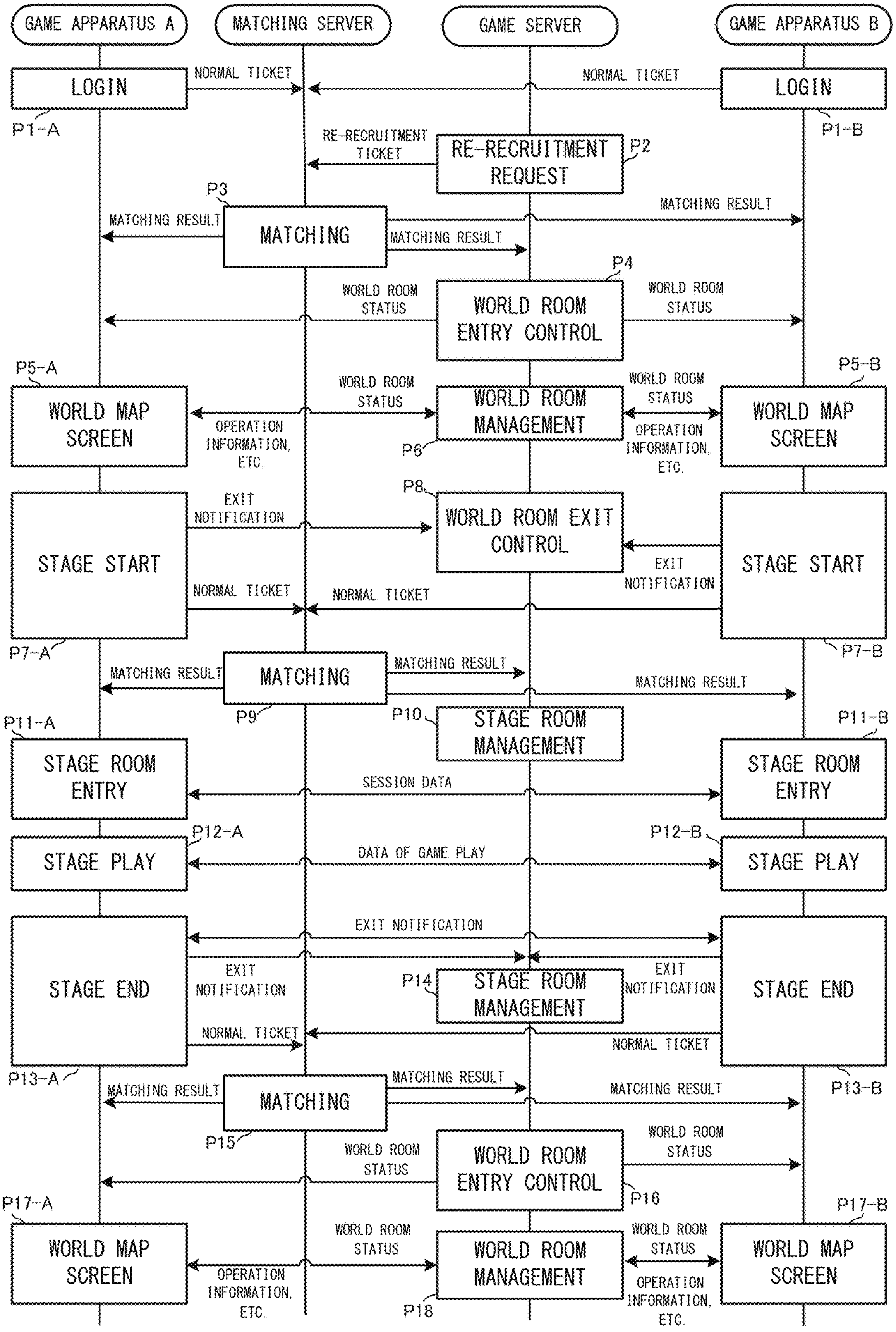
FIG. 11 is a non-limiting example diagram for describing data exchange in the exemplary embodiment.

FIG. 11 shows an example of data exchange in the matching process in the exemplary embodiment. FIG. 11 shows an example of a flow from start-up of the game to the end of playing a predetermined stage in each of a game apparatus A and a game apparatus B.

First, each game apparatus performs a login process, loads saved data, etc., and then transmits a normal ticket including information of the game apparatus to the matching server 2 (P1-A, P1-B). The normal ticket from each game apparatus includes information requesting matching for a world room related to the same world. For example, both normal tickets request matching designating "World 1".

The game server 1 controls the management of each of the above rooms, and transmits the above re-recruitment ticket if necessary (P2). Here, a re-recruitment ticket for a world room related to "World 1" in which 5 players are present is transmitted.

Next, the matching server 2 executes matching (P3). Here, as a result of the matching, the world room for the above re-recruitment, the game apparatus A, and the game apparatus B are matched. That is, the world room for the above re-recruitment is selected as the entry destination for the game apparatus A and the game apparatus B. The result of the matching is conveyed to the game apparatus A, the game apparatus B, and the game server 1. The process for this matching may be executed when the matching server 2 receives a ticket, or may be executed periodically at predetermined intervals.

Next, a world room status is transmitted from the game server 1 to the matched game apparatuses A and B (P4). The world room status includes information of the positions on the world map, etc., of the players who are currently in the world room.

Next, in each game apparatus, a world map screen in which a player character and a remote character are placed is generated and displayed on the basis of the world room status. Then, operation information and the world room status are transmitted and received between each game apparatus and the game server 1 as appropriate, and game processing related to the world map screen is executed (P5-A, P5-B, P6).

Next, a stage start operation is performed on each game apparatus (P7-A, P7-B). Here, it is assumed that the stage start operation is performed for the same stage on the game apparatus A and the game apparatus B at timings close to each other to some extent. In this case, first, an exit notification is transmitted from each game apparatus to the game server 1. In response to this, the game server 1 executes a process of causing the players of the game apparatus A and the game apparatus B to exit the world room (P8).

Furthermore, a normal ticket is transmitted from each game apparatus (game application thereof) to the matching server 2. In this case, the normal ticket includes information requesting matching for a stage room.

Next, the matching server 2 performs the matching for a stage room, and transmits the result of the matching to each game apparatus and the game server 1 (P9). In the matching for a stage room, as described above, matching is performed with not only the players in the original world room, but also other players who are currently logged in, as the targets to be matched. Here, it is assumed that the game apparatus A and the game apparatus B are matched.

Upon receiving the result of the matching for a stage room, the game server 1 executes a predetermined process for managing the stage rooms (P10). Specifically, update of room management data described later, etc., are executed.

In addition, a process of establishing a session between the game apparatus A and the game apparatus B that received the result of the matching is executed (P11-A, P11-B). That is, a process of entering a stage room is executed. Here, it is assumed that a new stage room (communication group) is created. In this case, as a result, a stage screen in which both the player character of the player A and the player character of the player B are displayed near the start point is displayed. That is, a situation in which the players enter the same stage room at almost the same time is represented.

Next, a process related to stage play is executed while P2P communication is performed between each game apparatus (P12-A, P12-B). During this time, the game server 1 may also transmit a re-recruitment ticket for the stage room as appropriate.

Next, when the stage is cleared, each game apparatus performs a stage end process (P13-A, P13-B). Here, it is assumed that the stage is cleared at almost the same time. In this process, first, an exit notification is transmitted to the other game apparatus and the game server 1, and exit from the stage room is performed. If necessary, the game server 1 also performs a process of deleting the stage room in which players are no longer present, for stage room management (P14).

When the exit from the stage room is completed, each game apparatus transmits a normal ticket to the matching server 2 to request matching for a world room.

The matching server 2 performs the matching for a world room, and transmits the result of the matching to each game apparatus 3 and the game server 1 (P15).

Then, as in the above, entry to a world room is performed on the basis of the result of the matching, and game processing related to a world map screen is executed (P16, P17-A, P17-B, P18).

In the exemplary embodiment, matching and entry to and exit from a world room or stage room are performed generally in this flow. Hereinafter, various kinds of data used in the game apparatuses 3, the game server 1, and the matching server 2 and processing performed in the game apparatuses 3, the game server 1, and the matching server 2 will be described in detail.

[Data Used in Game Server 1]

Figure 12:
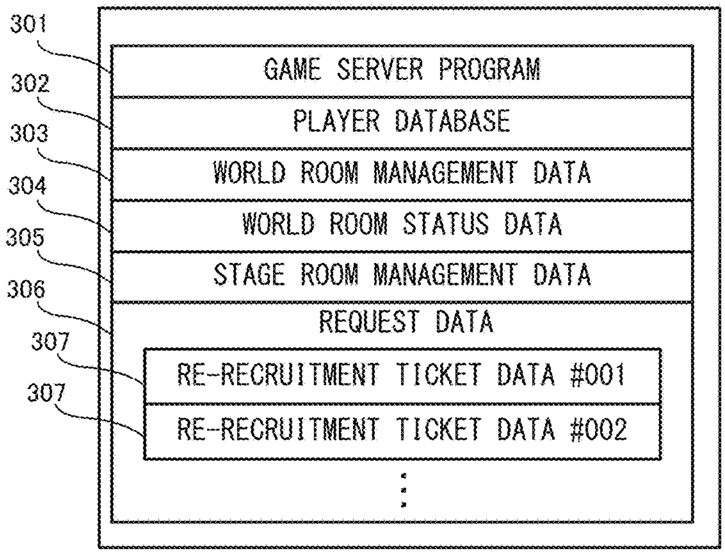
FIG. 12 illustrates a memory map showing a non-limiting example of various kinds of data stored in a storage section 12 of the game server 1.

First, data used in the game server 1 will be described. FIG. 12 illustrates a memory map showing an example of various kinds of data stored in the storage section 12 of the game server 1. In the storage section 12 of the game server 1, at least a game server program 301, a player database 302, world room management data 303, world room status data 304, stage room management data 305, and request data 306 are stored.

The game server program 301 is a program for executing game processing including processing for managing the above world rooms and stage rooms.

The player database 302 is a database regarding each player who plays the game according to the exemplary embodiment. Each record in this database includes, for example, a player ID for identifying each player, game apparatus identification information for identifying the game apparatus 3 currently used by each player, account information, etc.

The world room management data 303 is a database for managing the above world rooms. The world room management data 303 includes, for each world room, the identifier of the world room, the number of players in the world room, the player ID of each player in the world room, information of the position in the world map of each player character, etc.

The world room status data 304 is data for transmitting the status of each world room to the game apparatus 3 of each player who has entered the world room. For example, information indicating the position information of each player character in World Room 1A, etc., can be transmitted as the world room status data 304 to the game apparatus 3 of each player who has entered World Room 1A.

The stage room management data 305 is a database for managing the above stage rooms. The stage room management data 305 includes, for each currently existing stage room, the identifier of the stage room, the number of players in the stage room, the player ID of each player in the stage room, etc.

The request data 306 is data used when a request for matching is made from the game server 1 to the matching server 2. The request data 306 includes a plurality of re-recruitment ticket data 307.

Figure 13:
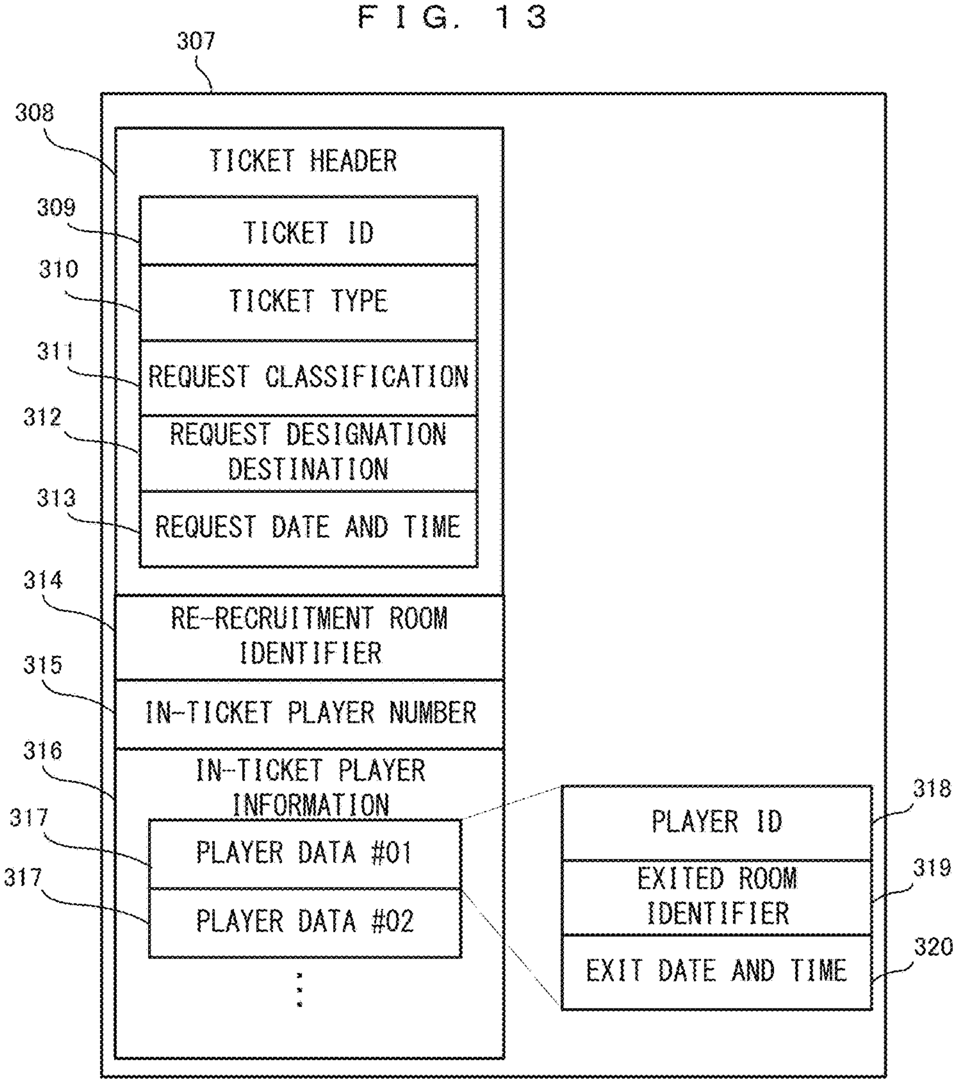
FIG. 13 shows a non-limiting example of the data structure of re-recruitment ticket data 307.

FIG. 13 shows an example of the data structure of the re-recruitment ticket data 307. The re-recruitment ticket data 307 includes at least a ticket header 308, a re-recruitment room identifier 314, an in-ticket player number 315, and in-ticket player information 316. The ticket header 308 includes at least a ticket ID 309, a ticket type 310, a request classification 311, a request designation destination 312, and request date and time 313.

The ticket ID 309 is identification information for uniquely identifying the re-recruitment ticket. The ticket type 310 is information for indicating whether the ticket is a normal ticket or a re-recruitment ticket. When a re-recruitment ticket is transmitted from the game server 1, the ticket type 310 is set to indicate that the ticket is a "re-recruitment ticket".

The request classification 311 is information indicating whether the ticket requests the above matching for a stage room or requests the above matching for a world room. When a re-recruitment ticket is transmitted for the purpose of filling up a world room with players, information designating "world room" is set in the request classification 311. Meanwhile, when a re-recruitment ticket is transmitted for the purpose of filling up a stage room with players, information designating "stage room" is set in the request classification 311.

The request designation destination 312 is information specifically indicating which world or stage room the matching is requested for. In the case of a re-recruitment ticket, the world number or stage number of the re-recruitment room related to the re-recruitment ticket, that is, the room itself to be filled up with players, is set. For example, when World Room 1A room is desired to be filled up with players, "World 1" is set in the request designation destination 312, and when World Room 1B is desired to be filled up with players, "World 1" is also set in the request designation destination 312. For example, when the "Stage 1-3C" room is desired to be filled up with players, "Stage 1-3" is set in the request designation destination 312. Also, when the "Stage 2-1B" room is desired to be filled up with players, "Stage 2-1" is set in the request designation destination 312.

In the request date and time 313, the date and time when the game server 1 transmitted the request including the re-recruitment ticket to the matching server 2, is set.

The re-recruitment room identifier 314 is the identifier of the re-recruitment room itself related to the re-recruitment ticket. In the exemplary embodiment, since a plurality of rooms can exist in parallel for the same world or the same stage, such as "World 1A" and "World 1B", the re-recruitment room identifier 314 is used as information for identifying each room itself. For example, when World Room 1B is desired to be filled up with players, the identifier of the "World 1B" room is set in the re-recruitment room identifier 314. For example, when the "Stage 1-3C" room is desired to be filled up with players, the identifier of the "Stage 1-3C" room is set in the re-recruitment room identifier 314.

The in-ticket player number 315 is information indicating the number of players included in the ticket. In the case of a re-recruitment ticket, the in-ticket player number 315 is information indicating the current number of players in the re-recruitment room. For example, when a re-recruitment ticket for a world room in which 10 players are present is transmitted, "10" is set in the in-ticket player number 315.

The in-ticket player information 316 is information of each player included in the ticket. In the case of a re-recruitment ticket, the in-ticket player information 316 is information of each player who is currently in the re-recruitment room. Therefore, the in-ticket player information 316 can include one or more player data 317. Each player data 317 includes at least a player ID 318, an exited room identifier 319, and exit date and time 320. The player ID 318 is information for identifying each player. The exited room identifier 319 is the identifier of the room that the player (the game apparatus 3 thereof) exited last. The exit date and time 320 is the date and time when the player exited the room. Although described in detail later, whether or not the timings of exiting the same room are close to each other to some extent is determined by using the exited room identifier 319 and the exit date and time 320.

In the exemplary embodiment, if the re-recruitment room is a stage room, the player data 317 of up to 3 players are included, and if the re-recruitment room is a world room, the player data 317 of up to 19 players are included. This is because, as described above, once the "normal quota" of 20 players is filled, no request is made for filling with players.

[Data Used in Matching Server 2]

Figure 14:
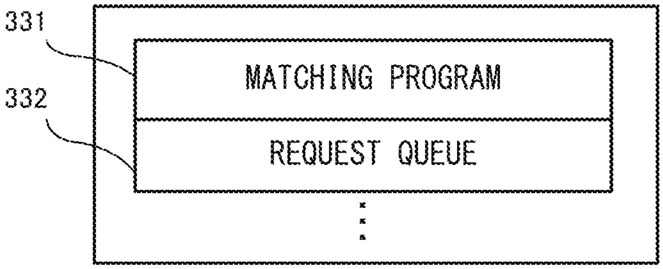
FIG. 14 illustrates a memory map showing a non-limiting example of various kinds of data stored in a storage section 22 of the matching server 2.

Next, the data used in the matching server 2 will be described. FIG. 14 illustrates a memory map showing an example of various kinds of data stored in the storage section 22 of the matching server 2. In the storage section 22 of the matching server 2, at least a matching program 331 and a request queue 332 are stored.

The matching program 331 is a program for controlling matching in the exemplary embodiment. In the exemplary embodiment, a matching process by the matching program 331 is executed periodically at predetermined intervals. For example, the matching process is executed at 3 second intervals. The request queue 332 is a storage area for temporarily storing matching requests transmitted to the matching server 2 during the periodical execution interval of the matching process.

Although not shown, transmission data for transmitting a matching result, etc., can also be generated as appropriate and stored in the storage section 22.

[Data Used in Each Game Apparatus 3]

Figure 16:
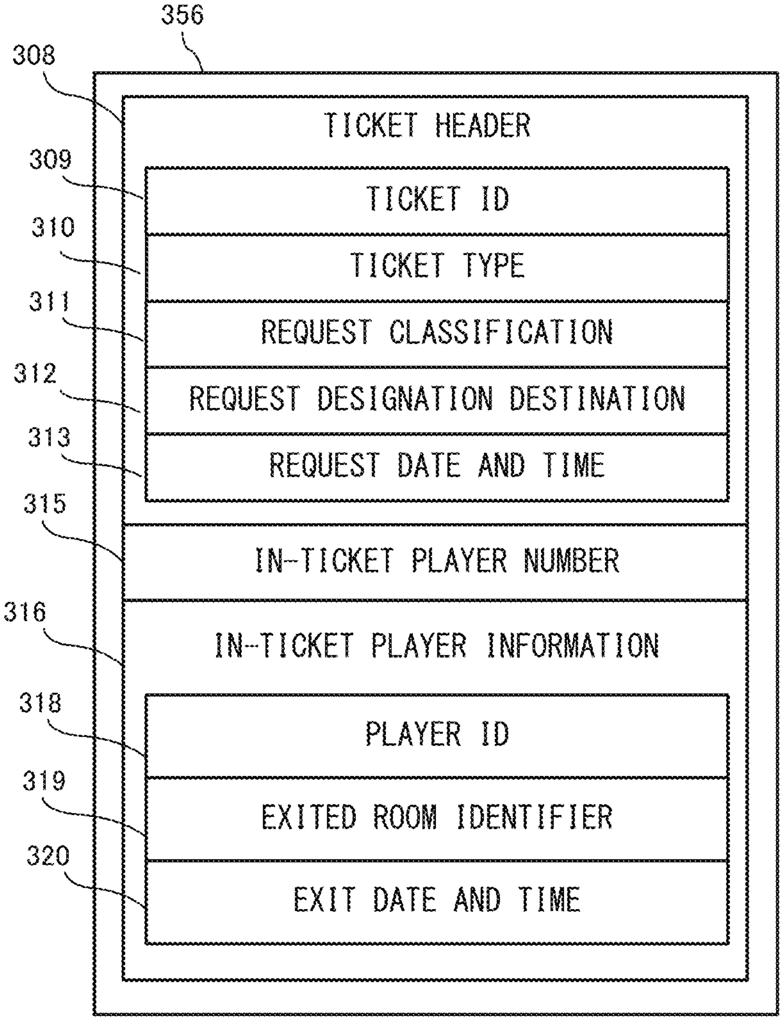
FIG. 16 shows a non-limiting example of the data structure of normal ticket data 356.

Next, data used in each game apparatus 3 will be described. FIG. 16 illustrates a memory map showing an example of various kinds of data stored in the storage section 32 of the game apparatus 3. In the storage section 32 of the game apparatus 3, at least a game program 351, player character data 352, world data 353, stage data 354, character data 355, normal ticket data 356, entered room data 357, operation data 358, a game mode flag 359, transmission data 360, and remote character control data 361 are stored.

The game program 351 is a program for executing the game processing according to the exemplary embodiment in the game apparatus 3.

The player character data 352 is data regarding the player character 201 to be operated by the player. The player character data 352 includes data indicating the position of the player character 201 in a world map or stage, data indicating the posture of the player character 201, etc.

The world data 353 includes various kinds of data for constructing each world as a virtual space. Specifically, the world data 353 includes, for each world, image data of each world and object data of stage objects and other objects to be placed in each world.

The stage data 354 includes data for constructing the above stages. Specifically, the stage data 354 includes, for each stage, position information of a start point and a goal point and data indicating the appearances, placement positions, action patterns, etc., of various objects to be placed in the stage.

The character data 355 is data regarding various characters that appear in this game. For example, the character data 355 includes the appearance and model data of each character. The appearances of the above remote characters are displayed on the basis of the character data 355.

The normal ticket data 356 is data of the above normal ticket to be transmitted from the game apparatus 3 to the matching server 2. FIG. 16 shows an example of the data structure of the normal ticket data 356. In FIG. 16, the normal ticket data 356 includes at least a ticket header 308, an in-ticket player number 315, and in-ticket player information 316. The data structure of the normal ticket data 356 is the same as that of the re-recruitment ticket data 307 shown in FIG. 13 above, with some exceptions. Specifically, the ticket header 308 has the same configuration as that of the re-recruitment ticket data 307. Therefore, the detailed description thereof is omitted, but unlike the re-recruitment ticket data 307, information indicating that the ticket is a "normal ticket" is set in the ticket type 310 in the normal ticket data 356. In addition, a value designating the world or stage to which the player desires to move is set in the request designation destination 312 in the normal ticket data 356. For example, when the player enters Stage 1-1 from World 1, "Stage 1-1" is set in the request designation destination 312. In addition, when the player moves from World 1 to World 2, "World 2" is set in the request designation destination 312.

Unlike the re-recruitment ticket data 307, the normal ticket data 356 does not include the above re-recruitment room identifier 314. In addition, in the exemplary embodiment, it is assumed that there is only one player for each game apparatus. Therefore, in the normal ticket data 356, the in-ticket player number 315 is set as one. In addition, the in-ticket player information 316 is configured to include only the player data 317 of one player for the game apparatus 3. In this regard, if, for example, two players are playing together on one game apparatus, information of the two players may be included in the in-ticket player information 316 of the normal ticket data 356.

Figure 15:
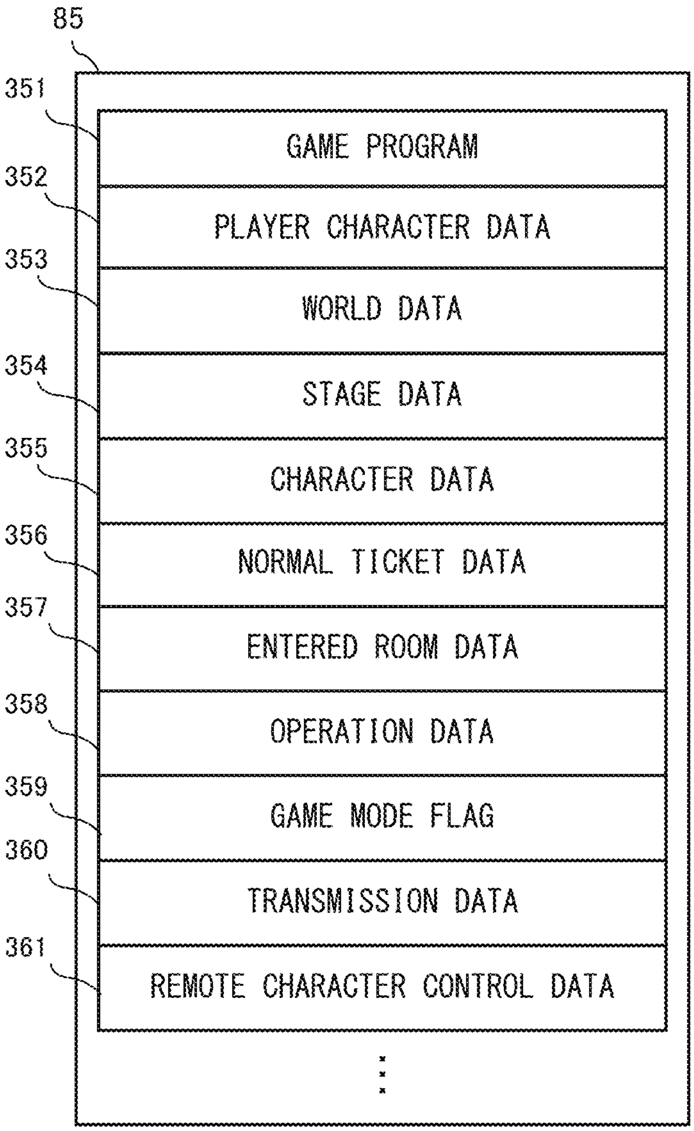
FIG. 15 illustrates a memory map showing a non-limiting example of various kinds of data stored in a storage section 32 of the game apparatus 3.

Referring back to FIG. 15, the entered room data 357 is information for identifying the room (session) in which the player is currently present. For example, if the player has entered a world room, the entered room data 357 includes the identifier, etc., of the world room. If the player has entered a stage room, the entered room data 357 includes the identifier, etc., of the stage room.

The operation data 358 is data acquired from the controller 4 operated by the player. That is, the operation data 358 is data indicating the contents of operations performed by the player.

The game mode flag 359 is a flag for distinguishing whether the player character is currently in a world map or in a stage in the game processing described later. In the exemplary embodiment, information indicating either "world map" or "stage play" is set.

The transmission data 360 is data for transmitting information regarding the player character to the game server 1 or other game apparatuses 3 in the same stage room. In the exemplary embodiment, the transmission data 360 includes information of the position of the player character in a world map or stage. In another exemplary embodiment, for example, the content of the operation data 358 may be included in the transmission data 360.

The remote character control data 361 is data for controlling the actions of the remote characters operated by other players in a world map screen or stage screen. In the world map screen, the remote character control data 361 is generated on the basis of the world room status data 304 transmitted from the game server 1. In the stage screen, the remote character control data 361 is generated on the basis of the transmission data 360 transmitted from other game apparatuses in the same stage room.

Next, the details of the game processing according to the exemplary embodiment will described. First, the details of processing performed in each game apparatus 3 will be described, followed by a description of processing in the game server 1 and the matching server 2.

[Details of Processing Performed by Processor 31 of Each Game Apparatus 3]

Figure 17:
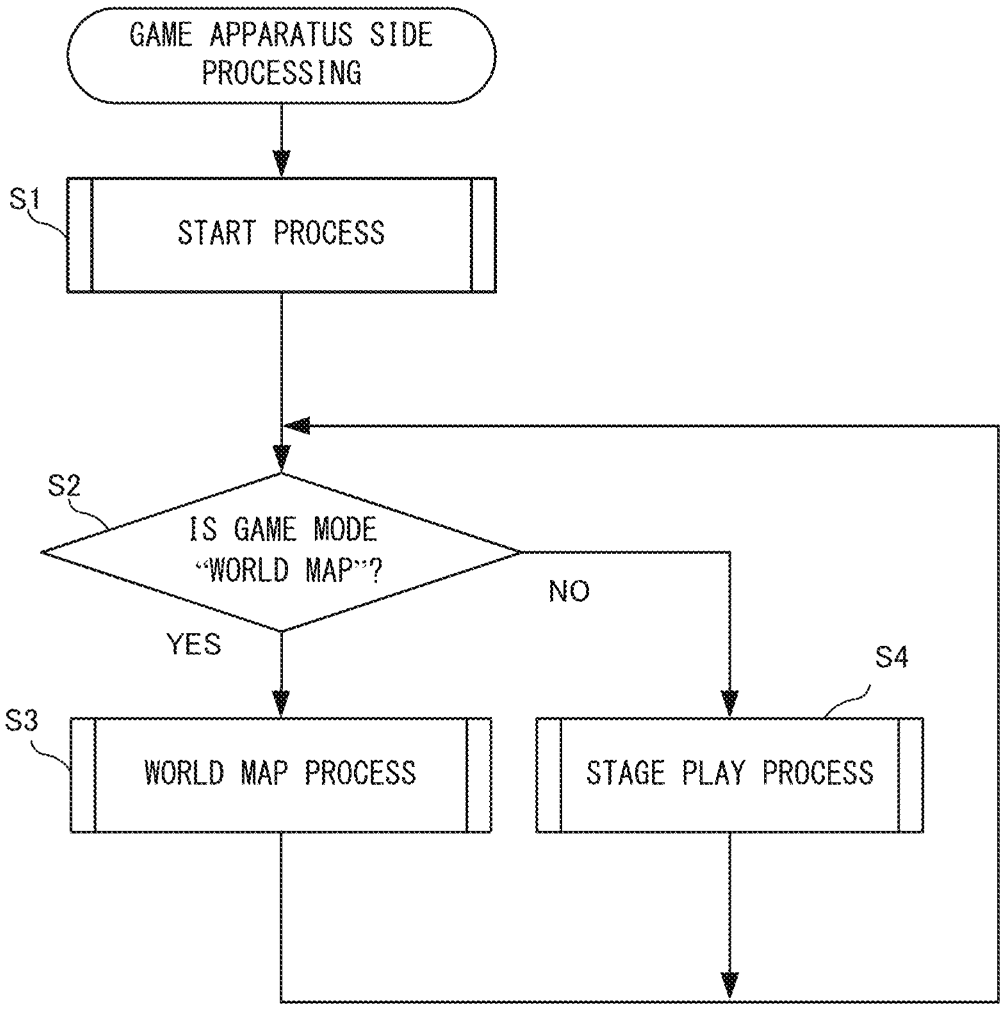
FIG. 17 is a non-limiting example flowchart showing the details of game processing executed in the game apparatus 3.

FIG. 17 is a flowchart showing the details of game apparatus-side processing executed by the processor 31 of the game apparatus 3. In the exemplary embodiment, flowcharts described below are realized by one or more processors reading and executing the above program stored in one or more memories. The flowcharts described below are merely an example of the processing. Therefore, the order of each process step may be changed as long as the same result is obtained. In addition, the values of variables and thresholds used in determination steps are also merely examples, and other values may be used as necessary.

Figure 18:
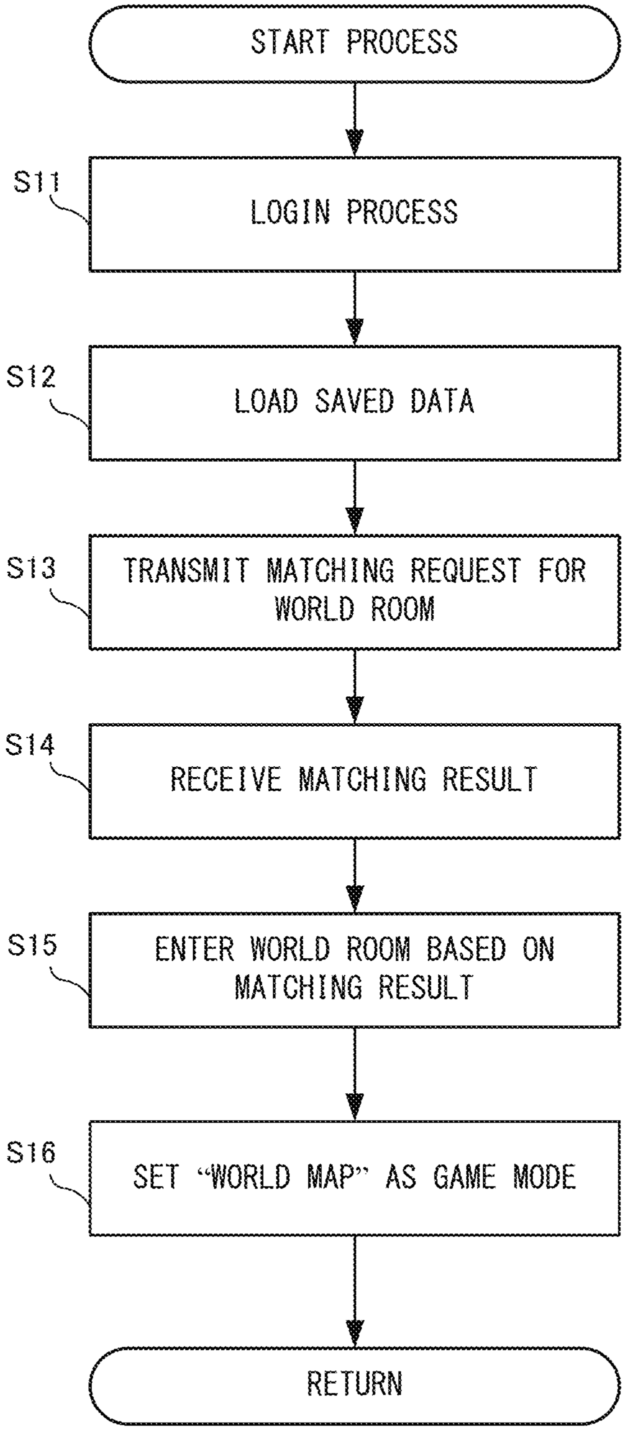
FIG. 18 is a non-limiting example flowchart showing the details of a start process.

When the game processing is started in the game apparatus 3, first, in step S1, the processor 31 executes a start process. FIG. 18 is a flowchart showing the details of the start process. In FIG. 18, first, in step S11, the processor 31 communicates with the game server 1 and executes a process of login.

Next, in step S12, the processor 31 acquires saved data from the storage section 32 of the game apparatus 3 and reproduces the progress status of the game.

Next, in step S13, the processor 31 transmits a matching request for a world room to the matching server 2. Specifically, as contents of the normal ticket data 356, the processor 31 sets “normal ticket” in the ticket type 310, and sets “world room” in the request classification 311. Furthermore, the processor 31 sets a predetermined world based on the saved data, in the request designation destination 312. For example, if the player was in World 3 at the last logout, “World 3” is set in the request designation destination 312. In addition, the processor 31 sets the player ID of the player as the player ID 318. Since it is the timing of login, Null is set as the exited room identifier 319 and the exit date and time 320. In addition, a predetermined value is automatically generated and set as the ticket ID 309. Then, the processor 31 sets a transmission execution time as the request date and time 313 and transmits the normal ticket data 356 to the matching server 2.

Next, in step S14, the processor 31 receives a matching result from the matching server 2. The matching result includes the identifier, etc., of one of the world rooms related to the designated world. In subsequent step S15, the processor 31 performs a process of entering the world room, on the basis of the matching result. That is, the processor 31 establishes a communication session with the game server 1 for the predetermined world room indicated by the matching result.

Next, in step S16, the processor 31 sets “world map” as the game mode flag 359. Then, the processor 31 ends the start process.

Referring back to FIG. 17, next, in step S2, the processor 31 determines whether or not the game mode flag 359 is “world map”. If, as a result of the determination, the game mode flag 359 is “world map” (YES in step S2), in step S3, the processor 31 executes a world map process. On the other hand, if the game mode flag 359 is not “world map” (NO in step S2), in step S4, the processor 31 executes a stage play process. Then, the processor 31 returns to step S1 above and repeats the processing. The world map process and the stage play process will be described in detail below.

[World Map Process]

Figure 19:
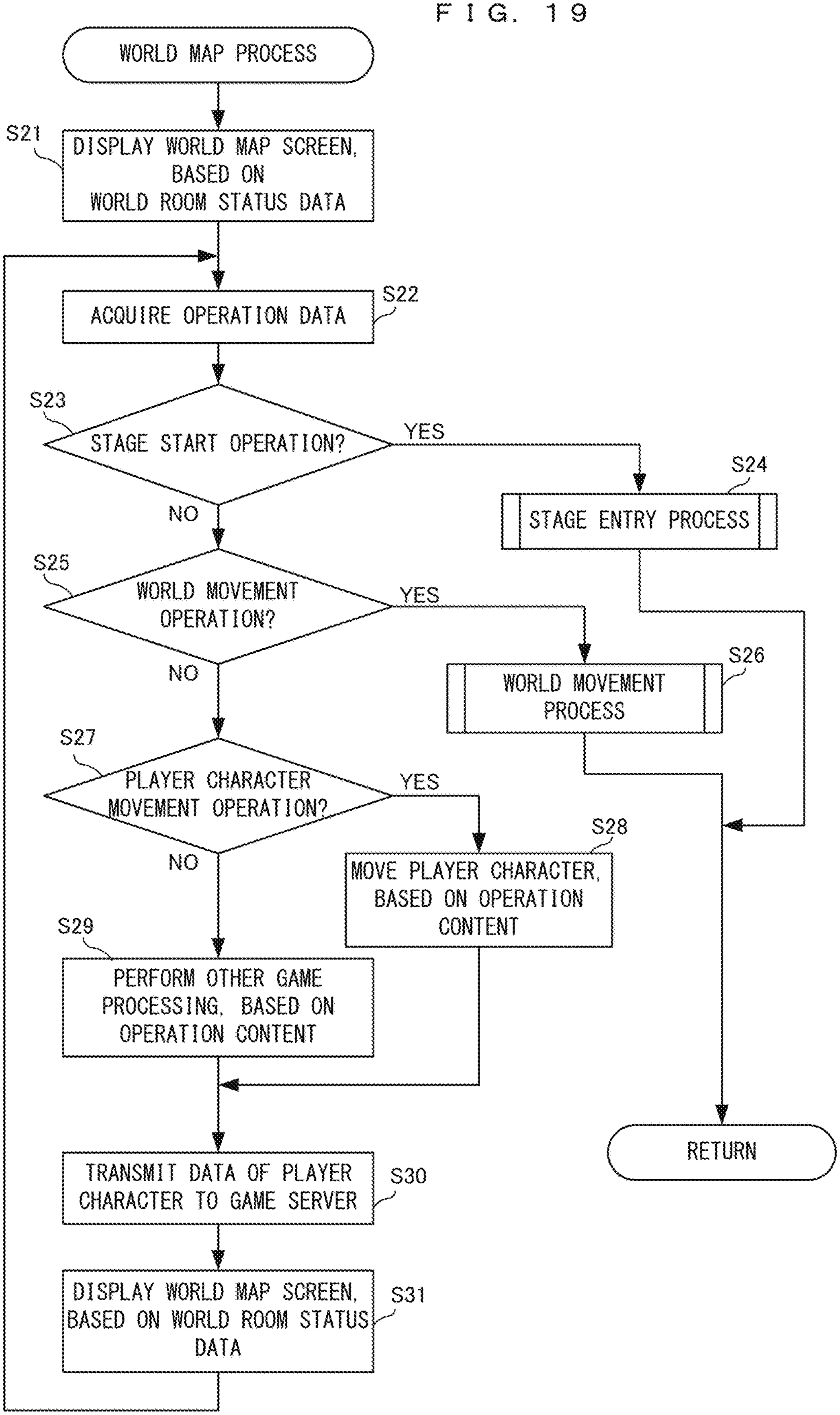
FIG. 19 is a non-limiting example flowchart showing the details of a world map process.

FIG. 19 is a flowchart showing the details of the world map process. In FIG. 19, first, in step S21, the processor 31 receives the world room status data 304 for the room to be entered, from the game server 1. Then, the processor 31 generates a world map screen on the basis of the received world room status data 304, and displays the world map screen on the display unit 5.

Next, in step S22, the processor 31 acquires the operation data 358. Next, in step S23, the processor 31 determines whether or not a stage start operation has been performed, on the basis of the operation data 358. If, as a result of the determination, a stage start operation has been performed, in step S24, the processor 31 executes a stage entry process.

[Stage Entry Process]

Figure 20:
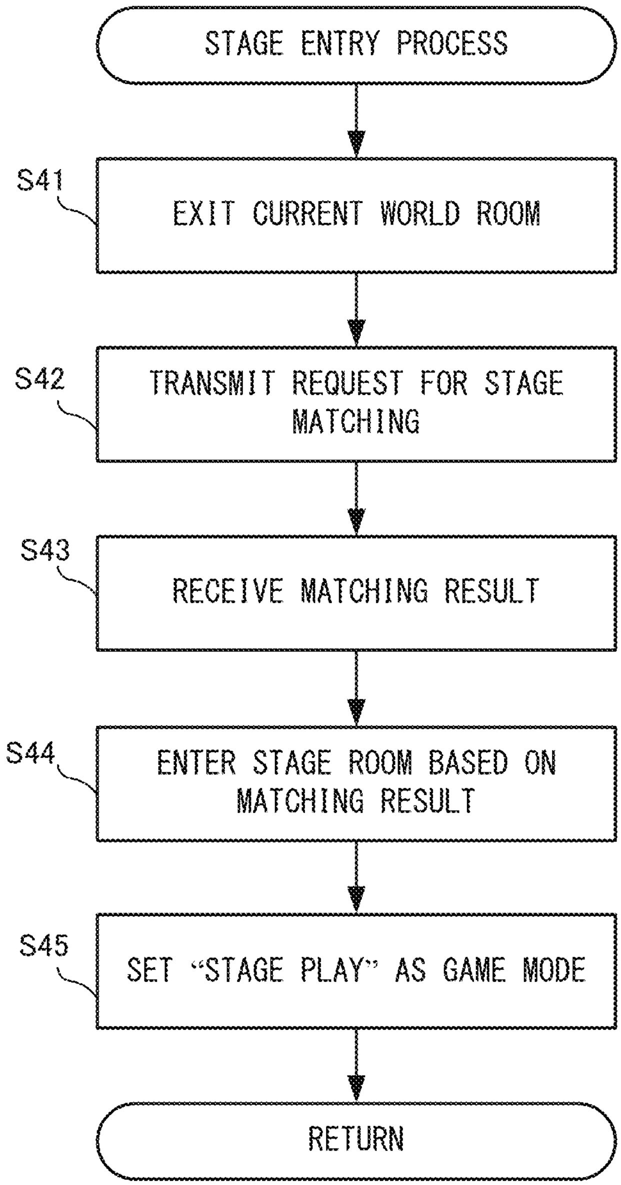
FIG. 20 is a non-limiting example flowchart showing the details of a stage entry process.

FIG. 20 is a flowchart showing the details of the stage entry process. In FIG. 20, first, in step S41, the processor 31 executes a process for exiting the world room in which the player is currently present. Specifically, the processor 31 transmits an exit notification to the game server 1 and ends the communication session with the game server 1.

Next, in step S42, the processor 31 transmits a matching request for the stage designated by the stage start operation, to the matching server 2. Specifically, the processor 31 sets the following contents in the normal ticket data 356, and transmits the normal ticket data 356 to the matching server 2. First, “normal ticket” is set in the ticket type 310. “Stage room” is set in the request classification 311, and the stage designated by the stage start operation is set in the request designation destination 312. For example, “Stage 1-1”, “Stage 1-3”, or the like can be set. In addition, the own player ID of the player is set as the player ID 318, and the identifier of the world room exited this time is set as the exited room identifier 319. Moreover, the date and time when the above communication session ended is set as the exit date and time 320. Moreover, a predetermined value is automatically generated as the ticket ID 309. Then, the processor 31 sets the request date and time 313, and transmits the normal ticket data 356 to the game server 1.

Next, in step S43, the processor 31 receives a matching result from the matching server 2. The matching result includes the identifier of a stage room determined as the room to be entered, the network addresses of other game apparatuses to be in the same room, etc. In subsequent step S44, the processor 31 performs a process of entering the determined stage room, on the basis of the matching result. That is, the processor 31 executes a process of establishing a communication session (P2P communication) for the stage room. If the player is the only player in the room, a communication session in which only one game apparatus participates is generated.

Next, in step S45, the processor 31 sets “stage play” as the game mode flag 359. Then, the processor 31 ends the stage entry process.

Referring back to FIG. 19, when the stage entry process ends, the world map process ends.

On the other hand, if, as a result of the determination in step S23 above, no stage start operation has been performed (NO in step S23), in step S25, the processor 31 determines whether or not a world movement operation has been performed. If, as a result of the determination, a world movement operation has been performed (YES in step S25), in step S26, the processor 31 executes a world movement process.

[World Movement Process]

Figure 21:
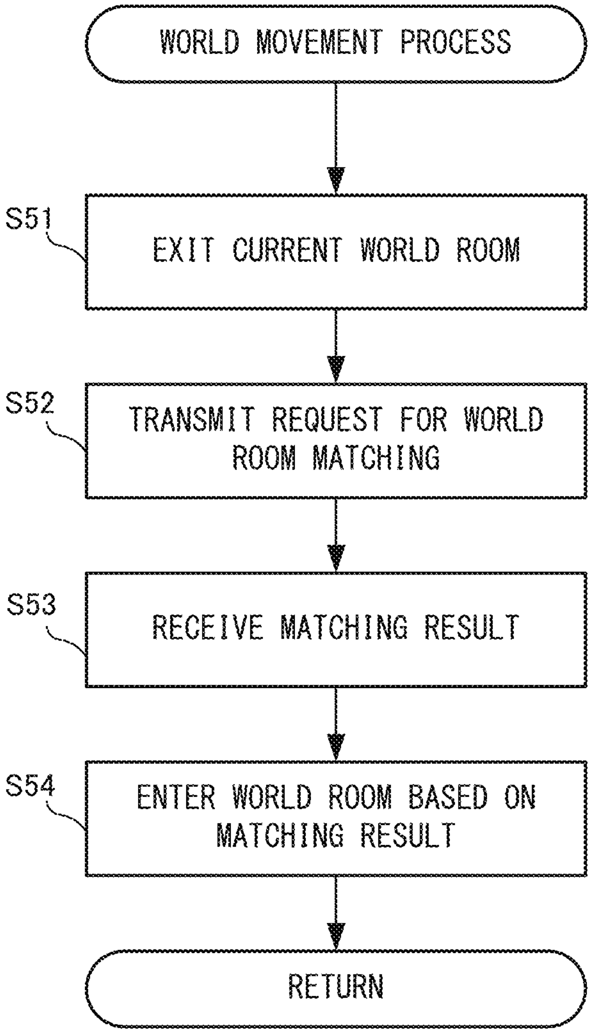
FIG. 21 is a non-limiting example flowchart showing the details of a world movement process.

FIG. 21 is a flowchart showing the details of the world movement process. In FIG. 21, first, in step S51, the processor 31 executes a process for exiting the world room in which the player is currently present. Specifically, the processor 31 transmits an exit notification to the game server 1 and ends the communication session with the game server 1.

Next, in step S52, the processor 31 transmits a matching request for the world designated by the world movement operation, to the matching server 2. Specifically, the processor 31 sets the following contents in the normal ticket data 356 and transmits the normal ticket data 356 to the matching server 2. First, "normal ticket" is set in the ticket type 310. "World room" is set in the request classification 311, and the world designated by the world movement operation is set in the request designation destination 312. For example, "World 2", "World 3", or the like can be set. In addition, the own player ID of the player is set as the player ID 318, and the identifier of the world room exited this time is set as the exited room identifier 319. Moreover, the date and time when the above communication session ended is set as the exit date and time 320. Moreover, a predetermined value is automatically generated as the ticket ID 309. Then, the processor 31 sets the request date and time 313, and transmits the normal ticket data 356 to the game server 1.

Next, in step S53, the processor 31 receives a matching result from the matching server 2. The matching result includes the identifier of the world room determined as the room to be entered. In subsequent step S54, the processor 31 performs a process of entering the determined world room, on the basis of the matching result. That is, the processor 31 executes a process of establishing a communication session with the game server 1 for the world room to be entered. Then, the processor 31 ends the world movement process.

Referring back to FIG. 19, when the world movement process ends, the world map process ends.

On the other hand, if, as a result of the determination in step S25 above, no world movement operation has been performed (NO in step S25), in step S27, the processor 31 determines whether or not an operation for moving the player character (hereinafter referred to as "movement operation") has been performed. If, as a result of the determination, a movement operation has been performed (YES in step S27), in step S28, the processor 31 moves the player character in the world map on the basis of the operation content. On the other hand, if no movement operation has been performed (NO in step S27), in step S29, the processor 31 executes other game processing on the world map screen on the basis of the operation content. For example, a process of scrolling the screen, viewing stage information, etc., can be executed.

Next, in step S30, the processor 31 generates transmission data 360 including information of the position of the player character in the world map. Then, the processor 31 transmits the transmission data 360 to the game server 1.

Next, in step S31, the processor 31 receives the world room status data 304 for the world room in which the player is currently present, from the game server 1. Then, the processor 31 sets the remote character control data 361 on the basis of the received world room status data 304 and controls the action of each remote character. Then, the processor 31 generates a world map screen reflecting the action of each remote character and the operation content for the player character, and displays the world map screen on the display unit 5. Then, the processor 31 returns to step S22 above and repeats the processing.

Figure 22:
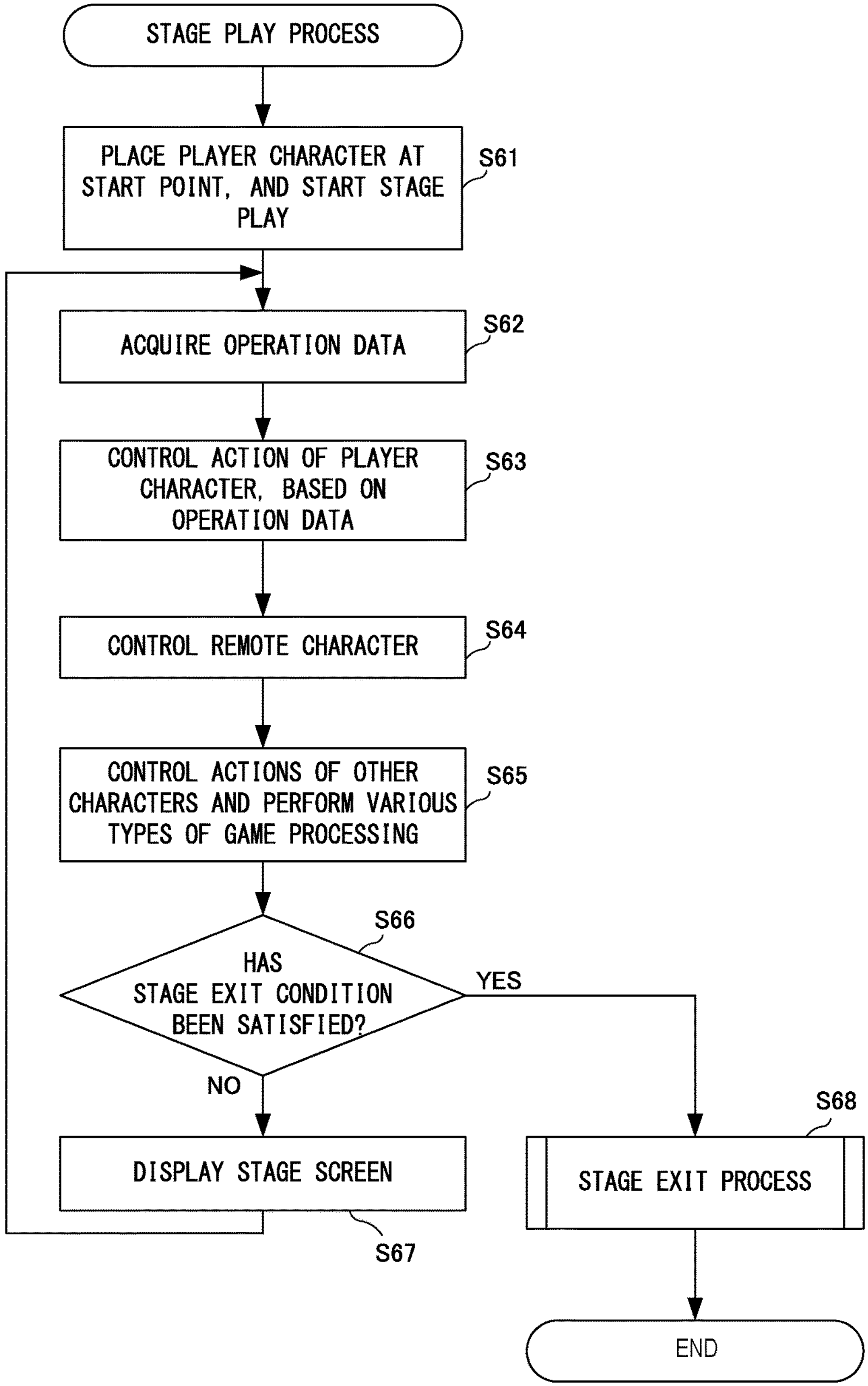
FIG. 22 is a non-limiting example flowchart showing the details of a stage play process

Next, the stage play process in step S4 above will be described. FIG. 22 is a flowchart showing the details of the stage play process. In FIG. 22, first, in step S61, the processor 31 generates a virtual space for the stage to be played this time. Furthermore, the processor 31 places the player character at a start point defined in the stage. In addition, if there is any other player in the room, a remote character is also placed. Specifically, the processor 31 receives the transmission data 360 from the other game apparatus 3 and generates remote character control data 361. Then, the processor 31 places the remote character at a predetermined position in the stage on the basis of the position information included in the remote character control data 361. Then, the processor 31 generates and displays a stage screen. Then, by waiting for an operation from the player, stage play by the player is started.

Next, in step S62, the processor 31 acquires the operation data 358.

Next, in step S63, the processor 31 controls the action of the player character 201 on the basis of the operation data 358.

Next, in step S64, the processor 31 controls the action of each remote character. Specifically, the processor 31 receives the transmission data 360 transmitted from the other game apparatus 3 and sets remote character control data 361. Then, the processor 31 moves the remote character on the basis of the remote character control data 361. In addition, at this time, the processor 31 determines whether or not an exit notification has been received from any other game apparatus 3, and if an exit notification has been received, a process of disconnecting this other game apparatus from the communication session is also performed as appropriate.

Next, in step S65, the processor 31 controls the actions of other characters such as enemy characters. Furthermore, the processor 31 also executes collision detection and various types of game processing based on the results thereof.

Next, in step S66, the processor 31 determines whether or not a condition for the player to exit the stage room has been satisfied. This condition is that the player character 201 reaches the goal point, that game over occurs, or that an operation for exiting in the middle is performed. If, as a result of the determination, the exit condition has not been satisfied (NO in step S66), in step S67, the processor 31 generates and displays a stage screen reflecting the above game processing. Then, the processor 31 returns to step S62 above and repeats the processing.

Figure 23:
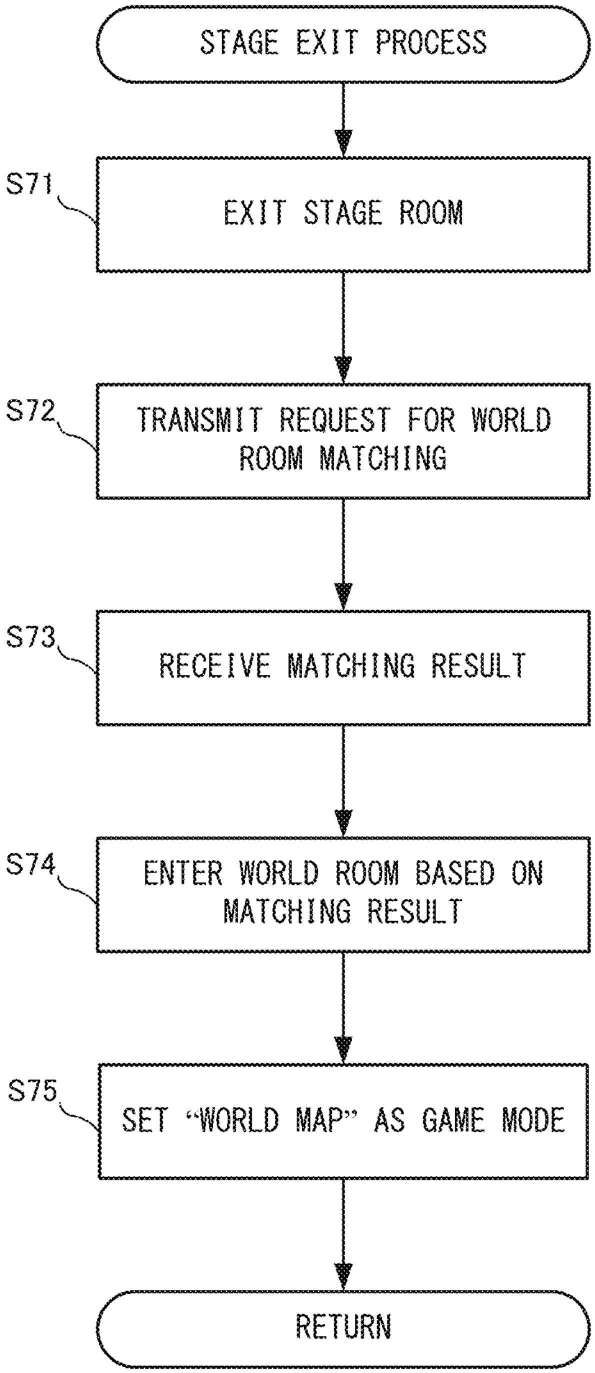
FIG. 23 is a non-limiting example flowchart showing the details of a stage exit process.

On the other hand, if the exit condition has been satisfied (YES in step S66), in step S68, the processor 31 executes a stage exit process. FIG. 23 is a flowchart showing the details of the stage exit process. In FIG. 23, first, in step S71, the processor 31 executes a process for exiting the stage room in which the player is currently present. Specifically, the processor 31 transmits an exit notification to the game server 1 and each other game apparatus 3 in the same stage room, and ends the communication session for the stage room.

Next, in step S72, the processor 31 transmits a matching request for a world to the matching server 2. Specifically, the processor 31 sets the following contents in the normal ticket data 356 and transmits the normal ticket data 356 to the matching server 2. First, "normal ticket" is set in the ticket type 310. "World room" is set in the request classification 311, and the world to which the current stage belongs is set in the request designation destination 312. For example, when exiting "Stage 2-1", "World 2" is set. In addition, the own player ID of the player is set as the player ID 318, and the identifier of the stage room exited this time is set as the exited room identifier 319. Moreover, the date and time when the communication session ended is set as the exit date and time 320. Moreover, a predetermined value is automatically generated as the ticket ID 309. Then, the processor 31 sets the request date and time 313, and transmits the normal ticket data 356 to the game server 1.

Next, in step S73, the processor 31 receives a matching result from the matching server 2. The matching result includes the identifier of the world room determined as the room to be entered. In subsequent step S74, the processor 31 performs a process of entering the determined world room, on the basis of the matching result. That is, the processor 31 executes a process of establishing a communication session with the game server 1 for the world room to be entered.

Next, in step S75, the processor 31 sets “world map” as the game mode flag 359. Then, the processor 31 ends the stage exit process.

Referring back to FIG. 22, when the stage exit process ends, the processor 31 ends the stage play process.

This is the end of the detailed description of the processing in the game apparatus 3.

[Processing in Game Server 1]

Figure 24:
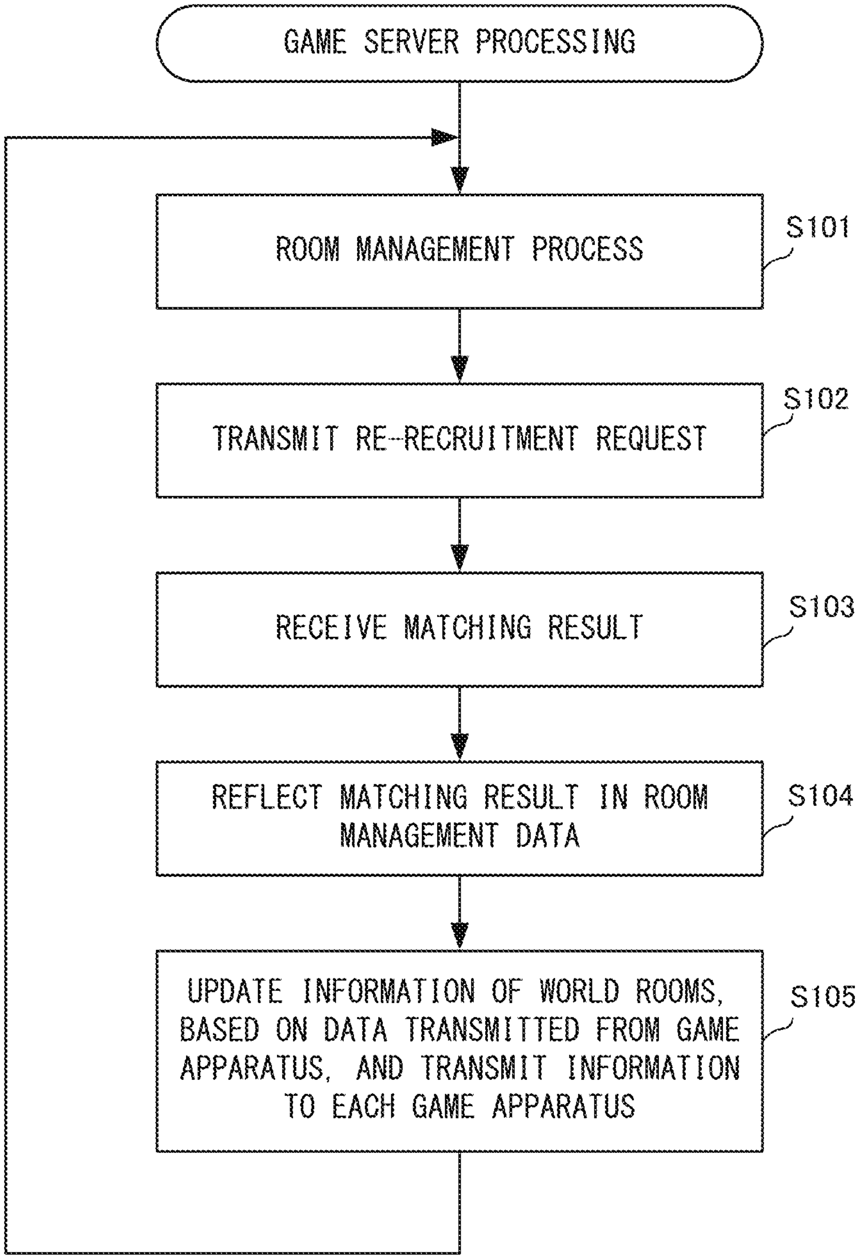
FIG. 24 is a non-limiting example flowchart showing the details of game server processing executed in the game server 1.

Next, processing executed in the game server 1 will be described in detail. FIG. 24 is a flowchart showing the details of the processing in the game server 1. In FIG. 24, first, in step S101, the processor 11 of the game server 1 performs a room management process. Specifically, the processor 11 performs a process of managing each room, etc., such as determination as to whether or not to fill up each room with players (whether or not to make a request for re-recruitment), a process of creating a new room if necessary, and a process of deleting a room in which players are no longer present. That is, a process of updating the world room management data 303 and the stage room management data 305 as appropriate is performed. In the exemplary embodiment, a world room in which 1 to 19 players are present and a stage room in which 1 to 3 players are present are determined as targets for which a request for re-recruitment is made.

Next, in step S102, the processor 11 makes a request for re-recruitment for the rooms for which it has been determined in step S101 above to make a request for re-recruitment. That is, the processor 11 generates, for each room, re-recruitment ticket data 307 in which the information of the room is set. Then, the processor 11 transmits the re-recruitment ticket data 307 to the matching server 2.

Next, in step S103, the processor 11 receives a matching result for each re-recruitment ticket from the matching server 2. Next, in step S104, the processor 11 establishes a communication session with predetermined game apparatuses 3 for each world room on the basis of the matching result. Furthermore, the processor 11 reflects the matching result in the world room management data 303 and the stage room management data 305. For example, if any player is assigned to the predetermined world room as a result of the matching, the information of the player who entered the corresponding world room, etc., in the world room management data 303 are updated as appropriate. For each stage room, similarly, the stage room management data 305 is updated as appropriate on the basis of the matching result.

Next, in step S105, the processor 11 updates the world room status data 304 for each world room on the basis of the data transmitted from each game apparatus 3. In addition, the processor 11 transmits the updated world room status data 304 to each game apparatus 3. That is, for each existing world room, the processor 11 transmits the position information of each player character in the room to the game apparatus 3 of each other player in the same room. Accordingly, the world map screen is synchronized between the game apparatuses connected to the same world room.

Then, the processor 11 returns to step S101 above and repeats the processing. This is the end of the detailed description of the processing in the game server 1.

[Processing in Matching Server 2]

Figure 25:
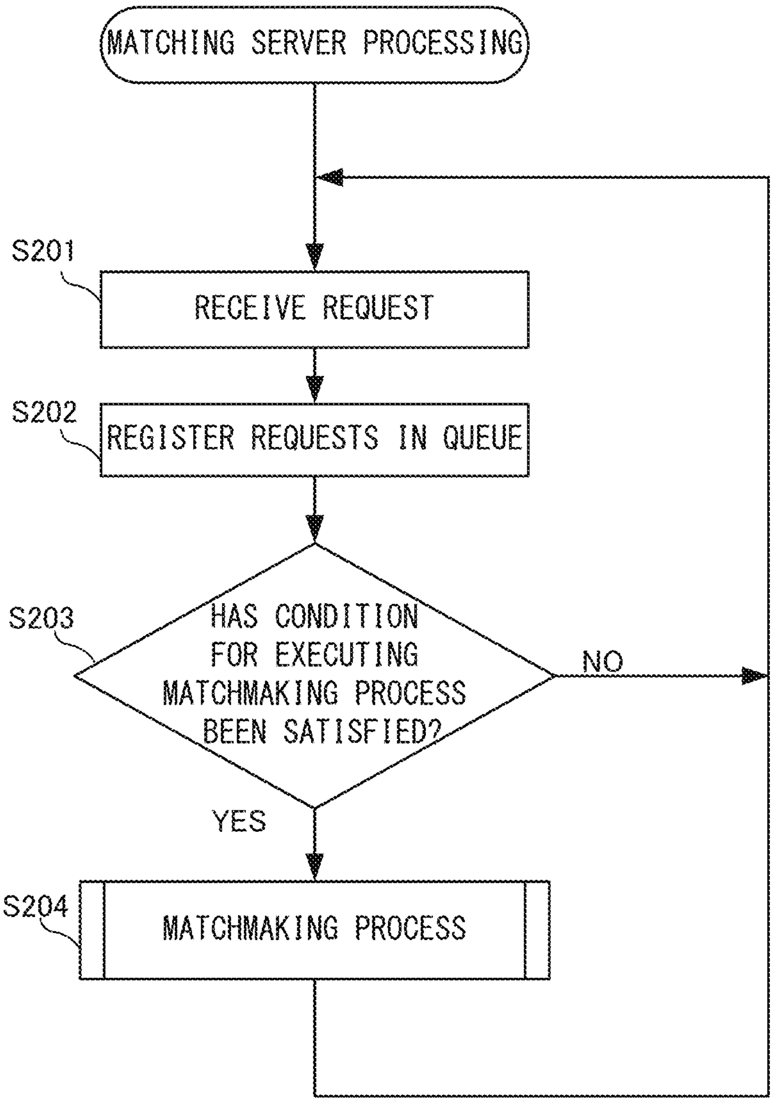
FIG. 25 is a non-limiting example flowchart showing the details of matching server processing executed in the matching server 2.

Next, processing executed in the matching server 2 will be described in detail. FIG. 25 is a flowchart showing the details of the processing in the matching server 2. In FIG. 25, first, in step S201, the processor 21 of the matching server 2 receives matching requests transmitted from the game apparatuses 3 and the game server 1.

Next, in step S202, the processor 21 registers the requests received in step S201 above, in the request queue 332.

Next, in step S203, the processor 21 determines whether or not a predetermined condition for executing a matchmaking process described next has been satisfied. For example, the matchmaking process may be executed every fixed period of time or when a predetermined number of requests have been accumulated in the request queue 332. Therefore, in step S203, for example, it may be determined whether or not a predetermined condition for executing the matchmaking process, such as whether the above fixed period of time has arrived or determination of the number of requests accumulated in the request queue 332, has been satisfied. In addition, the matchmaking process may be executed each time a request is received. In this case, whether or not a request has been newly received may be determined. If, as a result of the determination, the condition for executing the matchmaking process has not been satisfied (NO in step S203), the processor 21 returns to step S201 above and repeats the processing.

Figure 26:
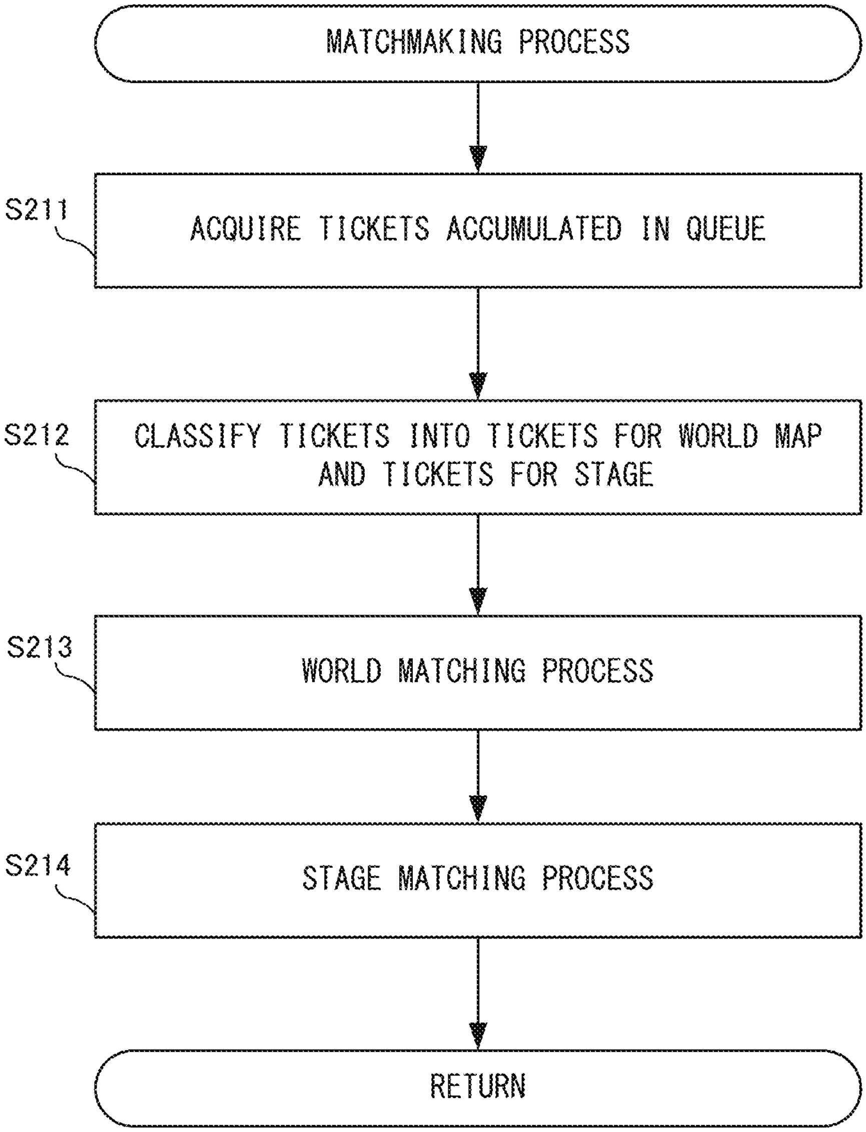
FIG. 26 is a non-limiting example flowchart showing the details of a matchmaking process.

On the other hand, if the condition for executing the matchmaking process has been satisfied (YES in step S203), in step S204, the processor 21 executes the matchmaking process. FIG. 26 is a flowchart showing the details of the matchmaking process. In FIG. 26, first, in step S211, the processor 21 acquires ticket data accumulated in the request queue 332. Furthermore, the processor 21 clears the request queue 332.

Next, in step S212, the processor 21 classifies the acquired ticket data into ticket data requesting matching for a world map room and ticket data requesting matching for a stage room on the basis of the above request classification 311.

Next, in step S213, the processor 21 executes a world matching process for the ticket data requesting matching for a world map room. In this process, matching is performed such that players who have selected the same world as their movement destination at timings that are close to each other to some extent are likely to be in the same room (the above priority condition 1). If there are no players who have selected the same world at timings that are close to each other to some extent, matching is performed such that a world room in which a larger number of players are present is preferentially selected (the above priority condition 2). As long as the priority condition 1 and the priority condition 2 can be achieved, matching may be performed by any method. For example, matching may be performed on the basis of the results of sorting the above tickets by the exited room identifier, the exit date and time, and the number of players in the re-recruitment room. As a result of such sorting, a sequence of tickets is created in which tickets that are for the same room and that are close to each other in terms of exit date and time are adjacent to each other. Then, matching may be performed utilizing this sorting order. Specifically, matching may be performed by the following process. First, the processor 21 sorts the above tickets requesting a world map room in the order of exited room identifier. In addition, the processor 21 further sorts tickets having the same room identifier, by exit date and time. This results in a sequence of tickets in which tickets that are for the same room and have exit dates and times close to each other are adjacent to each other. Next, the processor 21 sorts the tickets in the order of a larger number of players included in each ticket on the basis of the in-ticket player number 315. Here, the in-ticket player number 315 is only one for a normal ticket, which results in a sequence of tickets in which re-recruitment tickets are at the head of the sequence while maintaining the relationship in which tickets that are for the same room and have exit dates and times close to each other are adjacent to each other. Then, the processor 21 matches a ticket at the head of the sequence of tickets sorted thus with other normal tickets selected at random. The ticket at the head is a re-recruitment ticket as described above, and normal tickets selected at random are matched until the number of players in the world room related to this re-recruitment ticket reaches 30. Once 30 players are reached, normal tickets selected at random are matched in the same manner for the next (re-recruitment) ticket in the above sequence until 30 players are reached. By performing such a process for each world, matching is performed in accordance with the above priority conditions 1 and 2. Such a process realizes matching such that players who have selected the same world as their movement destination at close timings are likely to be in the same room.

Next, in step S214, the processor 21 executes a stage matching process for ticket data requesting matching for a stage room. In this process, matching is performed such that players who have selected the same stage as their movement destination at timings that are close to each other to some extent are likely to be in the same stage room (the above priority condition 1). If there are no players who have selected the same stage at timings that are close to each other to some extent, matching is performed such that a room in which any other player has entered and for which the entry time of the other player is closest to the time when a stage start operation was performed is preferentially selected (the above priority condition 2). As for the stage matching process as well, as long as the priority condition 1 and the priority condition 2 can be achieved, matching may be performed by any method. For example, matching may be performed on the basis of the results of sorting the above tickets by the exited room identifier and the exit date and time, and a time factor described below. Specifically, matching may be performed by the following process. First, as in the case of the above world room, the processor 21 sorts the above tickets requesting a stage room, in the order of exited room identifier and in the order of exit date and time. Next, the processor 21 evaluates whether matching is established between a ticket at the head of the sequence of tickets sorted thus and other tickets selected at random. At this time, the processor 21 considers the following time factor as a condition for matching to be established. That is, players between which the difference in the request date and time 313 is within a certain value are preferentially matched with each other. For example, first, whether or not the difference in the request date and time 313 is "within 10 seconds" is determined, and if the difference is "within 10 seconds", the matching is established at that time. On the other hand, if the difference is not "within 10 seconds", whether or not the difference in the request date and time 313 is "within 60 seconds" is determined, and if the difference is "within 60 seconds", the matching is established. That is, a process is performed in which, first, players between which the difference in timing of performing a stage entry operation is within 10 seconds are matched, and if there are no players for the range of 10 seconds, targets to be matched are searched for in a wider range of 60 seconds. As described above, the range for the difference in the request date and time 313 (time range) is widened stepwise, and if there is no other corresponding player even if the range is widened to some extent, matching is established between the ticket at the head and the other tickets selected at random, without considering the time factor. For example, determination may be performed such that the time factor is considered at up to three levels such as within 10 seconds, within 60 seconds, and within 120 seconds. If no player is found even if the range is widened to 120 seconds, the determination considering the time factor may be stopped at that time, and matching between another ticket selected at that time and the ticket at the head may be established.

As described above, in matching for a stage room, whether or not the ticket at the head and another ticket satisfy the condition for matching to be established is evaluated while the range for the difference in the request date and time 313 is widened stepwise. Accordingly, matching is realized such that players who have performed an entry operation for the same stage at close timings are likely to enter the same room. Even if there are no players who have an entry operation at close timings, the player can be eventually matched with someone else, thereby preventing the result of not being matched with anyone else depending on the timing.

When the stage matching process ends, the matchmaking process ends.

Referring back to FIG. 25, when the matchmaking process ends, the processor 21 returns to step S201 above and repeats the processing.

This is the end of the detailed description of the processing the matching server 2.

As described above, in the exemplary embodiment, in determining a stage room to be entered, the matching process is performed with not only other players in a world room in which the player is currently present, but also the players in other world rooms, as the targets to be matched, to determine an entry destination. Accordingly, it can be made easier to create a stage room in which a plurality of players are present. In other words, a shortage of players during stage play can be prevented.

In the exemplary embodiment, an entry destination is determined such that players who have selected the same world or the same stage as their movement destination at close timings are likely to be in the same room. Accordingly, the timing when each player starts stage play can be as close as possible when performing stage play. This makes it easier to provide a game experience in which the presence of other players is recognized. In addition, players who have cleared a stage at close timings can be caused to enter the same world room. This can provide room for subsequent use of highly coincidental encounters in the stage rooms. For example, this can lead to the development in which the same members continue to play in another stage room.

Even if there are no other players who have performed an entry operation at close timings, a room for which the game was started at the closest timing among the rooms for which the game was started by someone earlier is easily selected preferentially as an entry destination when performing stage play. That is, room entry is controlled such that the time when stage play is started is as close as possible to that of another player. This increases the possibility of encountering other players in the stage, and makes it easier to provide a game experience in which the presence of other players is recognized. In addition, it is also possible to create a situation in which each player is more likely to cooperate when each player feels that it is possible to do so, without interfering with single play of each player.

In the exemplary embodiment, matching is performed such that the number of players in one world room is as large as possible. Accordingly, many world rooms in which the number of players is small can be prevented from existing together, the liveliness of each world room can be improved, and a game experience in which the presence of remote players is likely to be felt can be provided.

MODIFICATIONS

In the above embodiment, as for stage play, the game processing in which only position information of each player character is basically shared and displayed and that does not affect the game progress of other players, except for some cooperative play elements as described above, is exemplified. In another exemplary embodiment, a multiplayer game may be executed in a manner that can affect the game progress of other players from the beginning, rather than in the form of exceptional cooperative play elements described above. That is, game processing may be performed such that the results of attacks, etc., made by other players on enemy characters are reflected in the game progress in the own game apparatus.

In the above embodiment, as for matching for a stage room, matching is performed using the time factor. In this regard, in another exemplary embodiment, for some special stages, matching may be performed without using the time factor as described above. For example, an example of special stages is a stage in which a start point and a goal point are not provided, for which a screen does not scroll and is a fixed screen, and in which a plurality of players cooperate to solve a puzzle-like gimmick. For such a stage, control may be performed such that matching is performed without being performed on the basis of the time factor. That is, matching based on the time factor as described above and matching not based on the time factor may be used selectively according to the content of the stage. More specifically, in a stage that is cleared by moving from the start to the goal, when player characters are separated in the stage, the player characters are less likely to come close to each other again, and thus matching based on the time factor may be performed. Meanwhile, in a stage that is cleared by achieving a condition within a certain range, even when player characters are temporarily separated in the stage, a situation in which the player characters come close to each other again is likely to occur, and thus matching not based on the time factor may be performed.

In the above embodiment, the matching method of sorting "tickets" as described above is exemplified in order to achieve the results indicated as the above "priority condition 1" and "priority condition 2". In this regard, in another exemplary embodiment, in order to achieve the same results, for example, "priority information" regarding each player who requested matching may be provided. The "priority information" may be set such that players who have exited the same room at close times (including players who have already entered the re-recruitment room) are matched preferentially with each other. The matching server 2 may then perform matching based on the "priority information"

While the present disclosure has been described in detail, the foregoing description is in all aspects illustrative and not restrictive. It is to be understood that numerous other modifications and variations can be devised without departing from the scope of the present disclosure.

What is claimed is:

1. A game system, comprising:

a game apparatus connected to a network;

a plurality of other game apparatuses connected to the network; and a server, wherein a computer of the game apparatus is caused to:

in a first mode:

transmit a request for a first matching process to the server, connect the game apparatus to a first other game apparatus group on the basis of a result of the first matching process received from the server, place an own player character to be controlled to move on the basis of an operation by a player of the game apparatus and at least a part of an other player character group to be controlled to move on the basis of data acquired from each other game apparatus included in the first other game apparatus group, in a first virtual game space, and rendering the first virtual game space, execute a stage selection process of selecting a predetermined game stage from among a plurality of game stages in accordance with an operation by the player of the game apparatus while the first virtual game space is displayed, and shift to a second mode in accordance with the stage selection process being executed, and in the second mode:

transmit a request for a second matching process to the server, connect the game apparatus to a second other game apparatus group on the basis of a result of the second matching process received from the server, and place the own player character and at least a part of an other player character group to be controlled by a player of each other game apparatus included in the second other game apparatus group, in a second virtual game space corresponding to the stage selected by the stage selection process, and render the second virtual game space, and a computer of the server is caused to:

in response to receiving the request for the first matching process from the game apparatus, match the game apparatus and the first other game apparatus group selected from among the plurality of other game apparatuses as the first matching process, and transmit a result of the first matching process to the game apparatus, and in response to receiving the request for the second matching process from the game apparatus, match the second other game apparatus group and the game apparatus with one or more other game apparatuses selected from among the plurality of other game apparatuses as the second other game apparatus group, without being limited to the first other game apparatus group matched by the first matching process, as the second matching process, and transmit a result of the second matching process to the game apparatus, wherein if, in the first mode, the player of the game apparatus and a predetermined player out of players of the other game apparatuses included in the first other game apparatus group select the same stage and the stage selection process for both players is executed within a predetermined period of time, the game apparatus is connected to the second other game apparatus group in which another game apparatus for the predetermined player is included, in the second mode.

2. The game system according to claim 1, wherein, by moving the own player character to any one stage object, out of a plurality of stage objects placed in the first virtual game space, the game stage associated with the stage object is selected in the first virtual game space.

3. The game system according to claim 1, wherein when shifting to the second mode, the connection to the first other game apparatus group in the first mode is cancelled.

4. The game system according to claim 1, wherein the computer of the game apparatus is further caused to shift to the first mode if a predetermined stage end condition is satisfied in the second mode, when the game apparatus shifts from the second mode to the first mode, the computer of the server is further caused to execute the first matching process with a third other game apparatus group in which another game apparatus not included in the first other game apparatus group can be included, as an object to be matched for the game apparatus, and the computer of the game apparatus is further caused to connect the game apparatus and a new first other game apparatus group determined by the first matching process with the third other game apparatus group as an object to be matched.

5. The game system according to claim 4, wherein if, in the second mode, timings when the player of the game apparatus and a predetermined player out of players of the other game apparatuses included in the second other game apparatus group clear the stage are included within a predetermined period of time, the game apparatus is connected to the first other game apparatus group in which a game apparatus of the predetermined player is included, in the first mode.

6. The game system according to claim 1, wherein world information defining a plurality of different virtual worlds that can be displayed as the first virtual game space is stored in the game system, and the computer of the game apparatus is further caused to:

execute a world movement process for moving from a first virtual world to a second virtual world in response to an operation by the player of the game apparatus while the first virtual game space corresponding to the first virtual world is displayed, when the world movement process is executed, cancel the connection to the first other game apparatus group connected at that time, and connect the game apparatus and a new first other game apparatus group including another game apparatus on which the first virtual game space corresponding to the second virtual world is displayed, on the basis of a result of the first matching process performed by the server in response to the world movement process.

7. A game processing method implemented in association with a game system including a game apparatus connected to a network, a plurality of other game apparatuses connected to the network, and a server, the game processing method comprising:

in a first mode:

transmitting a request for a first matching process to the server;

connecting the game apparatus to a first other game apparatus group on the basis of a result of the first matching process received from the server;

placing an own player character to be controlled to move on the basis of an operation by a player of the game apparatus and at least a part of an other player character group to be controlled to move on the basis of data acquired from each other game apparatus included in the first other game apparatus group, in a first virtual game space, and render the first virtual game space;

executing a stage selection process of selecting a predetermined game stage from among a plurality of game stages in accordance with an operation by the player of the game apparatus while the first virtual game space is displayed; and shifting to a second mode in accordance with the stage selection process being in the second mode: executed, and transmitting a request for a second matching process to the server;

connecting the game apparatus to a second other game apparatus group on the basis of a result of the second matching process received from the server; and placing the own player character and at least a part of an other player character group to be controlled by a player of each other game apparatus included in the second other game apparatus group, in a second virtual game space corresponding to the stage selected by the stage selection process, and rendering the second virtual game space, wherein the game processing method further comprises:

in response to receiving the request for the first matching process from the game apparatus, matching the game apparatus and the first other game apparatus group selected from among the plurality of other game apparatuses as the first matching process, and transmitting a result of the first matching process to the game apparatus; and in response to receiving the request for the second matching process from the game apparatus, matching the second other game apparatus group and the game apparatus with one or more other game apparatuses selected from among the plurality of other game apparatuses as the second other game apparatus group, without being limited to the first other game apparatus group matched by the first matching process, as the second matching process, and transmitting a result of the second matching process to the game apparatus, wherein in association with, in the first mode, the player of the game apparatus and a predetermined player out of players of the other game apparatuses included in the first other game apparatus group selecting the same stage and the stage selection process for both players being executed within a predetermined period of time, the game apparatus is connected to the second other game apparatus group in which another game apparatus for the predetermined player is included, in the second mode.

8. A non-transitory computer-readable storage medium having stored therein a game program to be executed by a game system including a game apparatus connected to a network, a plurality of other game apparatuses connected to the network, and a server, the game program causing computer resources of the game system to provide execution comprising:

in a first mode:

transmitting a request for a first matching process to the server;

connecting the game apparatus to a first other game apparatus group on the basis of a result of the first matching process received from the server;

placing an own player character to be controlled to move on the basis of an operation by a player of the game apparatus and at least a part of an other player character group to be controlled to move on the basis of data acquired from each other game apparatus included in the first other game apparatus group, in a first virtual game space, and rendering the first virtual game space;

executing a stage selection process of selecting a predetermined game stage from among a plurality of game stages in accordance with an operation by the player of the game apparatus while the first virtual game space is displayed; and shifting to a second mode in accordance with the stage selection process being executed, and in the second mode;

transmitting a request for a second matching process to the server;

connecting the game apparatus to a second other game apparatus group on the basis of a result of the second matching process received from the server; and placing the own player character and at least a part of an other player character group to be controlled by a player of each other game apparatus included in the second other game apparatus group, in a second virtual game space corresponding to the stage selected by the stage selection process, and rendering the second virtual game space, the game system is further caused to provide execution comprising:

in response to receiving the request for the first matching process from the game apparatus, matching the game apparatus and the first other game apparatus group selected from among the plurality of other game apparatuses as the first matching process, and transmitting a result of the first matching process to the game apparatus, and in response to receiving the request for the second matching process from the game apparatus, matching the second other game apparatus group and the game apparatus with one or more other game apparatuses selected from among the plurality of other game apparatuses as the second other game apparatus group, without being limited to the first other game apparatus group matched by the first matching process, as the second matching process, and transmitting a result of the second matching process to the game apparatus, wherein in association with, in the first mode, the player of the game apparatus and a predetermined player out of players of the other game apparatuses included in the first other game apparatus group selecting the same stage and the stage selection process for both players being executed within a predetermined period of time, the game apparatus is connected to the second other game apparatus group in which another game apparatus for the predetermined player is included, in the second mode.

9. The game processing method according to claim 7, wherein, by moving the own player character to any one stage object, out of a plurality of stage objects placed in the first virtual game space, the game stage associated with the stage object is selected in the first virtual game space.

10. The game processing method according to claim 7, wherein in association with shifting to the second mode, the connection to the first other game apparatus group in the first mode is cancelled.

11. The game processing method according to claim 7, wherein the game apparatus is further caused to shift to the first mode if a predetermined stage end condition is satisfied in the second mode, in association with the game apparatus shifting from the second mode to the first mode, the server is caused to execute the first matching process with a third other game apparatus group in which another game apparatus not included in the first other game apparatus group can be included, as an object to be matched for the game apparatus, and the game apparatus is further caused to connect the game apparatus and a new first other game apparatus group determined by the first matching process with the third other game apparatus group as an object to be matched.

12. The game processing method according to claim 11, wherein in association with, in the second mode, timings when the player of the game apparatus and a predetermined player out of players of the other game apparatuses included in the second other game apparatus group clear the stage being included within a predetermined period of time, the game apparatus is connected to the first other game apparatus group in which a game apparatus of the predetermined player is included, in the first mode.

13. The game processing method according to claim 7, wherein world information defining a plurality of different virtual worlds that can be displayed as the first virtual game space is stored in the game system, and the method further comprises:

executing a world movement process for moving from a first virtual world to a second virtual world in response to an operation by the player of the game apparatus while the first virtual game space corresponding to the first virtual world is displayed;

in association with the world movement process being executed, canceling the connection to the first other game apparatus group connected at that time; and connecting the game apparatus and a new first other game apparatus group including another game apparatus on which the first virtual game space corresponding to the second virtual world is displayed, on the basis of a result of the first matching process performed by the server in response to the world movement process.

14. The non-transitory computer-readable storage medium according to claim 8, wherein, by moving the own player character to any one stage object, out of a plurality of stage objects placed in the first virtual game space, the game stage associated with the stage object is selected in the first virtual game space.

15. The non-transitory computer-readable storage medium according to claim 8, wherein in association with shifting to the second mode, the connection to the first other game apparatus group in the first mode is cancelled.

16. The non-transitory computer-readable storage medium according to claim 8, wherein the game apparatus is further caused to shift to the first mode if a predetermined stage end condition is satisfied in the second mode, in association with the game apparatus shifting from the second mode to the first mode, the server is caused to execute the first matching process with a third other game apparatus group in which another game apparatus not included in the first other game apparatus group can be included, as an object to be matched for the game apparatus, and the game apparatus is further caused to connect the game apparatus and a new first other game apparatus group determined by the first matching process with the third other game apparatus group as an object to be matched.

17. The non-transitory computer-readable storage medium according to claim 16, wherein in association with, in the second mode, timings when the player of the game apparatus and a predetermined player out of players of the other game apparatuses included in the second other game apparatus group clear the stage being included within a predetermined period of time, the game apparatus is connected to the first other game apparatus group in which a game apparatus of the predetermined player is included, in the first mode.

18. The non-transitory computer-readable storage medium according to claim 8, wherein world information defining a plurality of different virtual worlds that can be displayed as the first virtual game space is stored in the game system, and the game system is further caused to provide execution comprising:

executing a world movement process for moving from a first virtual world to a second virtual world in response to an operation by the player of the game apparatus while the first virtual game space corresponding to the first virtual world is displayed;

in association with the world movement process being executed, canceling the connection to the first other game apparatus group connected at that time; and connecting the game apparatus and a new first other game apparatus group including another game apparatus on which the first virtual game space corresponding to the second virtual world is displayed, on the basis of a result of the first matching process performed by the server in response to the world movement process.

* * * * *